(12) United States Patent
Shin et al.

(10) Patent No.: US 10,185,176 B2
(45) Date of Patent: Jan. 22, 2019

(54) DISPLAY DEVICE

(71) Applicant: LG ELECTRONICS INC., Seoul (KR)

(72) Inventors: Dongsoo Shin, Seoul (KR); Junho Ko, Seoul (KR); Yohan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/641,176

(22) Filed: Jul. 3, 2017

(65) Prior Publication Data

US 2018/0004021 A1    Jan. 4, 2018

(30) Foreign Application Priority Data

Jul. 4, 2016 (KR) .................... 10-2016-0084035

(51) Int. Cl.

| | |
|---|---|
| *G02F 1/1333* | (2006.01) |
| *G02F 1/1335* | (2006.01) |
| *G02F 1/13357* | (2006.01) |
| *F21V 3/02* | (2006.01) |
| *F21V 7/05* | (2006.01) |
| *F21V 17/10* | (2006.01) |
| *F21V 19/00* | (2006.01) |
| *F21Y 113/13* | (2016.01) |
| *F21Y 115/10* | (2016.01) |

(52) U.S. Cl.
CPC .............. *G02F 1/1336* (2013.01); *F21V 3/02* (2013.01); *F21V 7/05* (2013.01); *F21V 17/101* (2013.01); *F21V 19/0015* (2013.01); *G02F 1/133308* (2013.01); *F21Y 2113/13* (2016.08); *F21Y 2115/10* (2016.08); *G02F 1/133603* (2013.01); *G02F 1/133608* (2013.01); *G02F 2001/133314* (2013.01); *G02F 2001/133322* (2013.01); *G02F 2201/46* (2013.01)

(58) Field of Classification Search
CPC ............... G02B 6/0068; G02B 6/0086; G02F 2001/133314; G02F 2201/46; G02F 1/1333
USPC ................................. 362/632–634
See application file for complete search history.

(56) References Cited

U.S. PATENT DOCUMENTS

| | | | |
|---|---|---|---|
| 7,259,810 B2 * | 8/2007 | Kim .................. | G02F 1/133604 362/330 |
| 2007/0002590 A1 * | 1/2007 | Jang .................. | G02F 1/133603 362/633 |
| 2014/0153284 A1 | 6/2014 | Hong | |

FOREIGN PATENT DOCUMENTS

| | | |
|---|---|---|
| EP | 2450619 | 5/2012 |
| EP | 2876490 | 5/2015 |
| WO | 2013170503 | 11/2013 |

OTHER PUBLICATIONS

European Patent Office Application No. 17179359.9, Search Report dated Sep. 22, 2017, 8 pages.

* cited by examiner

*Primary Examiner* — William J Carter
(74) *Attorney, Agent, or Firm* — Lee, Hong, Degerman, Kang & Waimey PC

(57) ABSTRACT

A display device is disclosed. The display device includes a display panel, a frame behind the display panel, a light assembly positioned between the display panel and the frame and providing the display panel with light, and a substrate mounted with the light assembly and positioned in front of the frame. The frame includes a flat portion forming a flat surface and a trench forming a stepped portion together with the flat portion. The substrate is positioned on the trench.

10 Claims, 47 Drawing Sheets

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2016-0084035, filed on Jul. 4, 2016, the contents of which are hereby incorporated by reference herein in its entirety.

BACKGROUND OF THE INVENTION

Field of the Invention

The present disclosure relates to a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

Accordingly, an object of the present disclosure is to address the above-described and other problems.

Another aspect of the present disclosure is to provide a display device capable of maintaining initial image quality by improving durability of the display device.

Another aspect of the present disclosure is to provide a display device capable of varying an arrangement of light sources of a backlight unit.

Another aspect of the present disclosure is to provide a display device capable of improving light efficiency of a backlight unit.

Another aspect of the present disclosure is to provide a display device capable of securing structural rigidity of a slim frame.

Another aspect of the present disclosure is to provide a display device capable of improving a support structure of an optical layer.

Another aspect of the present disclosure is to provide a display device capable of improving the assembly convenience of a holder and preventing the detachment of the holder.

Another aspect of the present disclosure is to provide a display device capable of improving the durability against an external impact.

In one aspect, there is provided a display device including a display panel, a frame behind the display panel, a light assembly between the display panel and the frame, the light assembly providing the display panel with light, and a substrate mounted with the light assembly and positioned in front of the frame, wherein the frame includes a flat portion forming a flat surface, and a trench forming a stepped portion together with the flat portion, wherein the substrate is positioned on the trench.

According to another aspect of the present disclosure, the frame may include a first trench forming a stepped portion together with the flat portion, and a second trench forming a stepped portion together with the flat portion and having a width greater than a width of the first trench. The substrate may include a first substrate mounted with a plurality of light assemblies and positioned on the first trench, and a second substrate mounted with a plurality of light assemblies and positioned on the second trench to be adjacent to a side of the second trench.

According to another aspect of the present disclosure, the frame may include a first trench positioned in the center of the frame, extended in a left-right direction of the frame, and forming a stepped portion together with the flat portion of the frame, a second trench spaced apart from the first trench in one direction, extended in the left-right direction of the frame, forming a stepped portion together with the flat portion of the frame, and having a width greater than a width of the first trench, and a third trench spaced apart from the first trench in a different direction from the one direction, extended in the left-right direction of the frame, forming a stepped portion together with the flat portion of the frame, and having a width greater than the width of the first trench.

According to another aspect of the present disclosure, the substrate may include a first substrate mounted with a plurality of light assemblies and positioned on the first trench, a second substrate mounted with a plurality of light assemblies and positioned on the second trench to be adjacent to a side of the second trench far from the first trench, and a third substrate mounted with a plurality of light assemblies and positioned on the third trench to be adjacent to a side of the third trench far from the first trench.

According to another aspect of the present disclosure, the substrate may include a first substrate mounted with a plurality of light assemblies and positioned on the second trench to be adjacent to a side of the second trench close to the first trench, and a second substrate mounted with a plurality of light assemblies and positioned on the third trench to be adjacent to a side of the third trench close to the first trench.

According to another aspect of the present disclosure, the frame may include a flat portion forming the flat surface, a first inclined portion extended from one side of the flat portion and forming an inclination together with the flat portion, a second inclined portion extended from another side meeting the one side of the flat portion, meeting the first inclined portion, and forming an inclination, that is greater than the inclination of the first inclined portion, together with the flat portion, a first trench positioned in the center of the frame, extended in a left-right direction of the frame, and forming a stepped portion together with the flat portion of the frame, a second trench spaced apart from the first trench in one direction, extended in the left-right direction of the frame, forming a stepped portion together with the flat portion of the frame, and having a width greater than a width of the first trench, and a third trench spaced apart from the first trench in a different direction from the one direction, extended in the left-right direction of the frame, forming a stepped portion together with the flat portion of the frame, and having a width greater than the width of the first trench.

According to another aspect of the present disclosure, the substrate may include a first substrate mounted with a plurality of light assemblies and positioned on the second trench to be adjacent to a side of the second trench close to the first trench, and a second substrate mounted with a plurality of light assemblies and positioned on the third trench to be adjacent to a side of the third trench close to the first trench. A light assembly, that is adjacent to the first inclined portion and the second inclined portion among the plurality of light assemblies, may have a shape extended toward one of the first inclined portion and the second inclined portion.

According to another aspect of the present disclosure, a light assembly adjacent to the first inclined portion and the second inclined portion may have a shape extended toward the first inclined portion.

According to another aspect of the present disclosure, the frame may include a plurality of first projections formed on the first trench and sequentially arranged along a longitudinal direction of the first trench, a plurality of second projections formed on the second trench and sequentially arranged along a longitudinal direction of the second trench, and a plurality of third projections formed on the second trench, sequentially arranged along the longitudinal direction of the second trench, and spaced apart from the plurality of second projections.

According to another aspect of the present disclosure, a height of each of the plurality of first to third projections may be substantially the same as a depth of each of the first to third trenches.

An effect of the display device according to the present disclosure is described below.

According to at least one aspect of the present disclosure, the present disclosure can maintain the initial image quality of the display device by improving the durability of the display device.

According to at least one aspect of the present disclosure, the present disclosure can vary an arrangement of light sources of a backlight unit.

According to at least one aspect of the present disclosure, the present disclosure can improve the light efficiency of the backlight unit.

According to at least one aspect of the present disclosure, the present disclosure can secure the structural rigidity of a slim frame.

According to at least one aspect of the present disclosure, the present disclosure can improve a support structure of an optical layer.

According to at least one aspect of the present disclosure, the present disclosure can improve the assembly convenience of a holder and prevent the detachment of the holder.

According to at least one aspect of the present disclosure, the present disclosure can improve the durability of the display device against an external impact.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
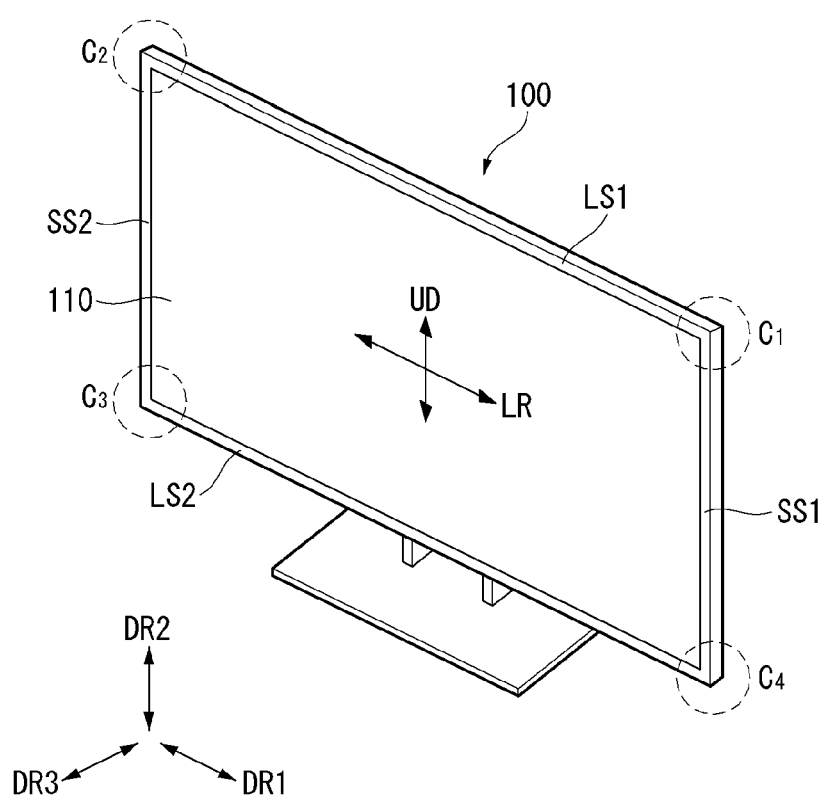
FIGS. 1, 2, 3, 4 and 5 illustrate examples of a display device related to the present disclosure.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100.

Further, a third direction DR3 may be a direction vertical to the first direction DR1 and/or the second direction DR2.

In the embodiment disclosed herein, the first direction DR1 and the second direction DR2 may be commonly referred to as a horizontal direction. Further, the third direction DR3 may be referred to as a vertical direction.

In another point of view, a side or a surface, on which the display device 100 displays an image, may be referred to as a front side or a front surface. When the display device 100 displays the image, a side or a surface, at which the image cannot be observed, may be referred to as a back side or a back surface. When the display device 100 is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In the embodiment disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

FIGS. 1 to 5 illustrate examples of a display device related to the present disclosure.

Figure 2:
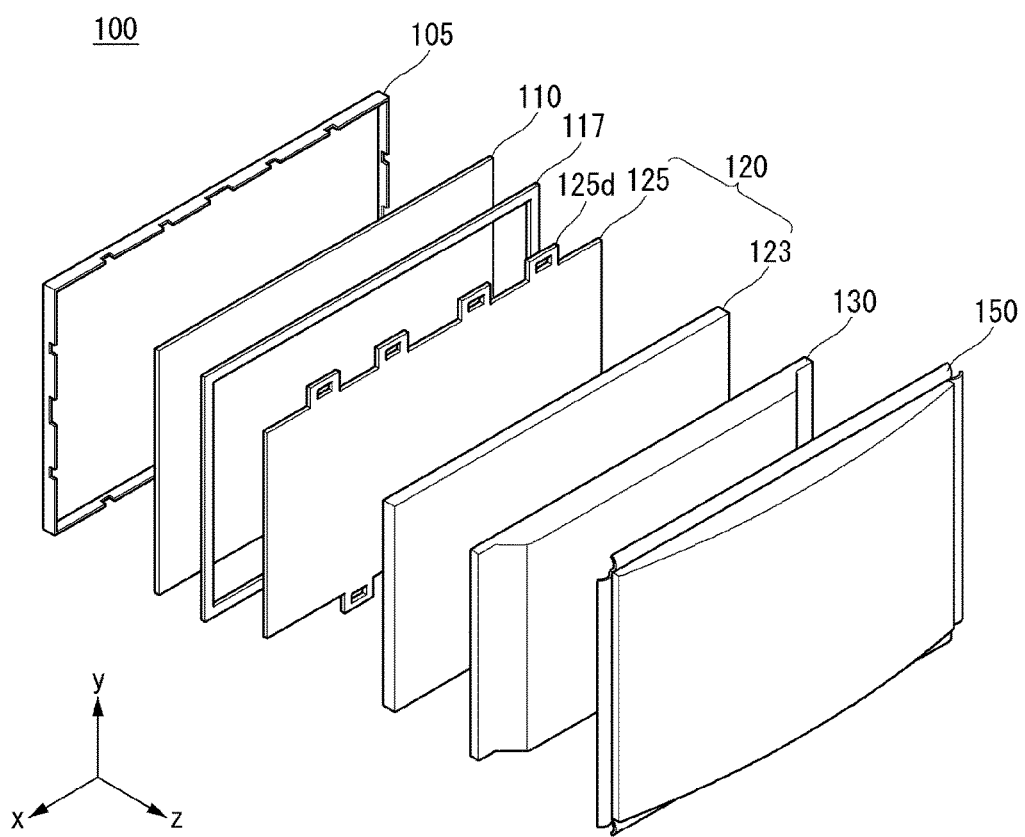

Referring to FIGS. 1 and 2, a display panel 110 may be positioned in front of a display device 100 and may display an image. The display panel 110 may include a plurality of pixels and may output the image while controlling color, brightness, and chroma of each pixel.

The display panel 110 may be divided into an active area on which the image is displayed, and an inactive area on which the image is not displayed. The display panel 110 may include a front substrate and a back substrate that are positioned opposite each other with a liquid crystal layer interposed therebetween.

The front substrate may include a plurality of pixels each including red, green, and blue subpixels. The front substrate may generate an image corresponding to red, green, or blue color in response to a control signal.

The back substrate may include switching elements. The back substrate may switch on and off pixel electrodes. For example, the pixel electrodes may change a molecule arrangement of the liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transfer light provided by a backlight unit 120 to the front substrate.

A front cover 105 may cover at least a portion of a front surface and a side surface of the display panel 110. The front cover 105 may have a rectangular fame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover at the front surface of the display panel 110 and the side cover at the side surface of the display panel 110. The front cover and the side cover may be separately configured. One of the front cover and the side cover may be omitted. For example, the front cover may be omitted, and only the side cover may be absent in terms of a beautiful appearance of the display device 100.

A guide panel 117 may be positioned in the rear of the display panel 110. The guide panel 117 may support a portion of a back surface of the display panel 110. The guide panel 117 may contact an edge of the display panel 110. The guide panel 117 may be coupled to a frame 130.

The backlight unit 120 may be positioned in the rear of the display panel 110. The backlight unit 120 may include a plurality of light sources. The light sources of the backlight unit 120 may be arranged in an edge type or a direct type. In case of the edge type backlight unit 120, a light guide plate or a light guide panel may be added.

The backlight unit 120 may be positioned in front of the frame 130. For example, the plurality of light sources may be disposed at a front surface of the frame 130. In this instance, the backlight unit 120 may be commonly called the direct type backlight unit 120.

The backlight unit 120 may be driven in an entire driving method or a partial driving method, such as a local dimming method and an impulsive driving method. The backlight unit 120 may include an optical sheet 125 and an optical layer 123.

The optical sheet 125 may disperse light of the light sources. The optical sheet 125 may be configured as a plurality of layers. For example, the optical sheet 125 may include at least one prism sheet and/or at least one diffusion sheet.

The optical sheet 125 may further include at least one coupling portion 125d. The coupling portion 125d may be coupled to the front cover 105 and/or a back cover 150. Namely, the coupling portion 125d may be directly coupled to the front cover 105 and/or the back cover 150. Alternatively, the coupling portion 125d may be coupled to a structure coupled to the front cover 105 and/or the back cover 150. Namely, the coupling portion 125d may be indirectly coupled to the front cover 105 and/or the back cover 150.

The optical layer 123 may include the light sources, etc. The optical layer 123 will be described in detail in the corresponding paragraphs.

The frame 130 may support the components constituting the display device 100. For example, the backlight unit 120 may be coupled to the frame 130. The frame 130 may be formed of a metal material, for example, an aluminum alloy.

The back cover 150 may be positioned in the rear of the display device 100. The back cover 150 may protect an inner configuration of the display device 100 from the outside. At least a portion of the back cover 150 may be coupled to the frame 130 and/or the front cover 105. The back cover 150 may be an injection production formed of a resin material (or an injection molded resin material).

Figure 3:
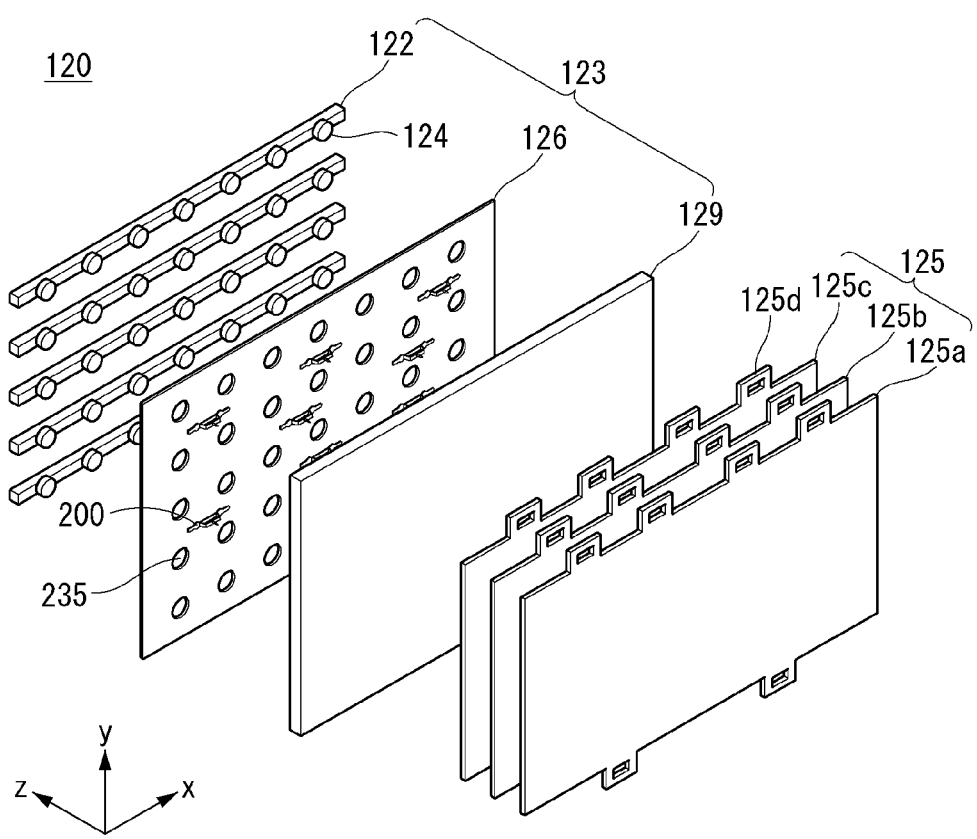

Referring to FIG. 3, the backlight unit 120 may include the optical layer 123 including a substrate 122, at least one light assembly 124, a reflective sheet 126 and a diffusion plate 129, and the optical sheet 125 positioned in front of the optical layer 123. The configuration of the backlight unit 120 is not limited thereto. For example, one or more of the components constituting the backlight unit 120 may be omitted.

The substrate 122 may be configured as a plurality of straps, which is extended in a first direction and is spaced apart from one another by a predetermined distance in a second direction perpendicular to the first direction.

At least one light assembly 124 may be mounted on the substrate 122. The substrate 122 may have an electrode pattern for connecting an adaptor to the light assembly 124. For example, a carbon nanotube electrode pattern may be used for the electrode pattern.

The substrate 122 may be formed of at least one of polyethylene terephthalate (PET), glass, polycarbonate (PC), and silicon. The substrate 122 may be a printed circuit board (PCB).

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in a second direction.

The light assembly 124 may be one of a light emitting diode (LED) chip and a LED package having at least one LED chip.

The light assembly 124 may be configured as a colored LED emitting at least one of red, green, and blue light or a white LED. The colored LED may include at least one of a red LED, a green LED, and a blue LED.

The light source included in the light assembly 124 may be a COB (chip-on board) type. The COB light source may be configured such that the LED chip as the light source is directly coupled to the substrate 122. Hence, a manufacturing process may be simplified. Further, a resistance may be reduced, and thus a loss of energy due to heat may decrease. Namely, power efficiency of the light assembly 124 may increase. The COB light source may provide the brighter lighting. The COB light source may be manufactured to be thinner and lighter than a related art.

The reflective sheet 126 may be positioned at a front surface of the substrate 122. The reflective sheet 126 may have through holes 235, and the light assembly 124 may be inserted into the through hole 235.

The reflective sheet 126 may reflect light emitted from the light assembly 124 forward. Further, the reflective sheet 126 may again reflect light reflected from the diffusion plate 129 toward the diffusion plate 129.

The reflective sheet 126 may include at least one of metal and metal oxide, each of which is a reflection material. The reflective sheet 126 may include metal and/or metal oxide having a high reflectance, for example, at least one of aluminum (Al), silver (Ag), gold (Au), and titanium dioxide ($TiO_2$).

The reflective sheet 126 may be formed by depositing and/or coating the metal or the metal oxide on the substrate 122. An ink including the metal material may be printed on the reflective sheet 126. A deposition layer may be formed on the reflective sheet 126 using a thermal deposition method, an evaporation method, or a vacuum deposition method such as a sputtering method. A coating layer and/or a printing layer may be formed on the reflective sheet 126 using a printing method, a gravure coating method, or a silk screen method.

An air gap may be positioned between the reflective sheet 126 and the diffusion plate 129. The air gap may serve as a buffer capable of widely spreading light emitted from the light assembly 124. A supporter (or support plate) 200 may be positioned between the reflective sheet 126 and the diffusion plate 129, so as to maintain the air gap.

A resin may be deposited on the light assembly 124 and/or the reflective sheet 126. The resin may function to diffuse light emitted from the light assembly 124. The diffusion plate 129 may diffuse light emitted from the light assembly 124 upwardly.

The optical sheet 125 may be positioned in front of the diffusion plate 129. A back surface of the optical sheet 125 may face the diffusion plate 129, and a front surface of the optical sheet 125 may face the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. A number and/or a position of the diffusion sheets and the prism sheets may be changed.

The diffusion sheet can prevent light coming from the diffusion plate 129 from being partially concentrated and can more uniformly distribute the light. The prism sheet can concentrate light coming from the diffusion sheet and may make the concentrated light be vertically incident on the display panel 110.

The coupling portion 125d may be formed on at least one of a side and an edge of the optical sheet 125. The coupling portion 125d may be formed on at least one of the first to third optical sheets 125a to 125c.

The coupling portion 125d may be formed at a long side or an edge of the optical sheet 125. The coupling portion 125d on a first long side and the coupling portion 125d on a second long side may be asymmetrical to each other. For example, a number and/or a position of the coupling portions 125d on the first long side may be different from a number and/or a position of the coupling portions 125d on the second long side.

Figure 4:
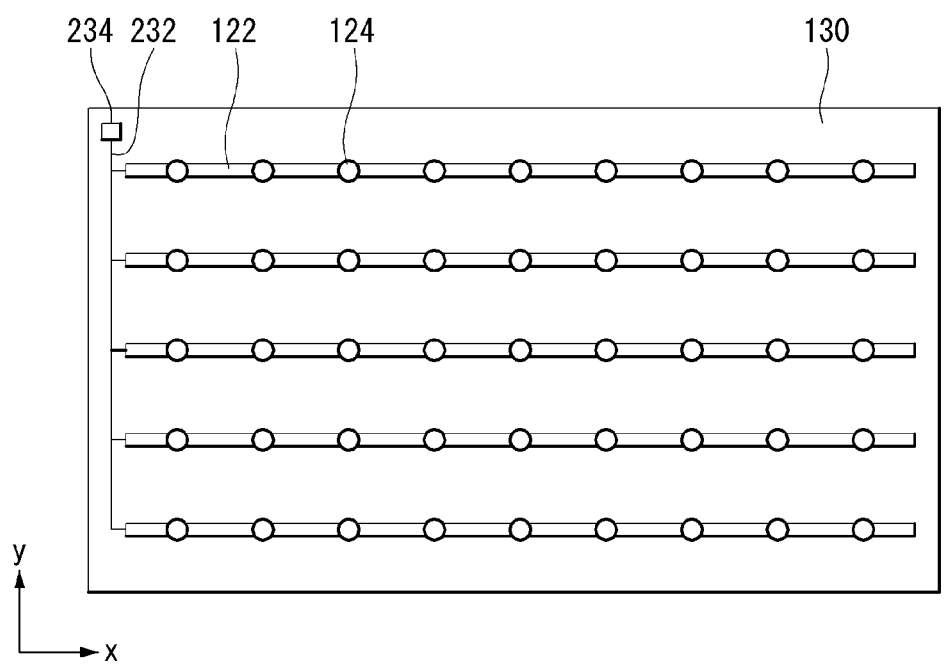

Referring to FIG. 4, the substrate 122 including the plurality of straps, which is extended in the first direction and are spaced apart from one another by a predetermined distance in the second direction perpendicular to the first direction, may be provided on the frame 130. One end of each of the plurality of substrates 122 may be connected to a wire electrode 232.

The wire electrode 232 may be extended in the second direction. The wire electrode 232 may be connected to the ends of the substrates 122 at predetermined intervals in the second direction.

A wire hole 234 may be formed at one end of the wire electrode 232. The wire hole 234 may be a fine hole penetrating the frame 130. The wire electrode 232 may be extended to a back surface of the frame 130 through the wire hole 234. The wire electrode 232 may be electrically connected to an adaptor (not shown) positioned at the back surface of the frame 130 through the wire hole 234.

The light assemblies 124 may be mounted on each substrate 122 (or each strap) at predetermined intervals in the first direction. A diameter of the light assembly 124 may be greater than a width of the substrate 122 in the second direction.

Figure 5:
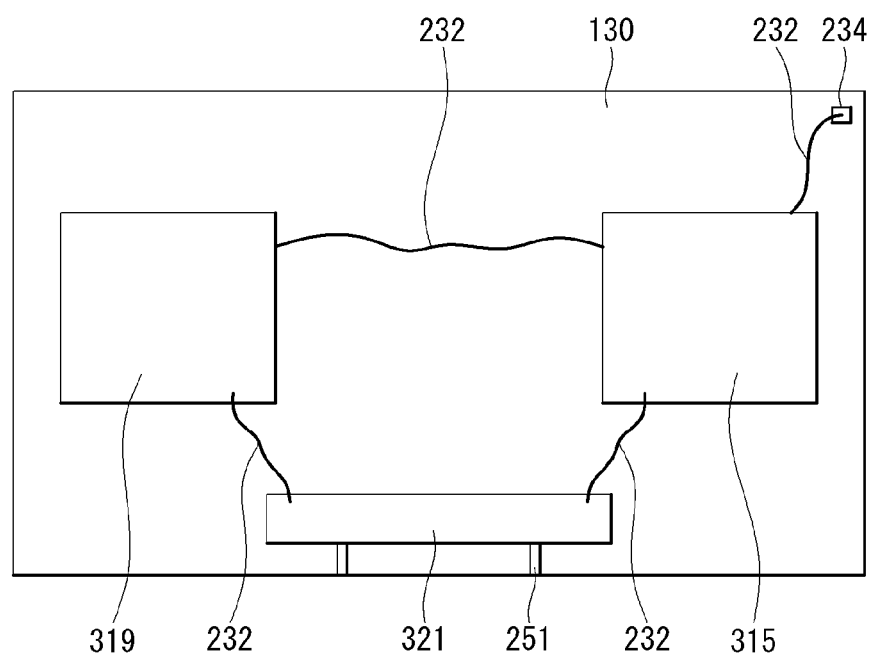

Referring to FIG. 5, the wire electrode 232 extending from the front surface of the frame 130 through the wire hole 234 may be electrically connected to a power supply board 315. The power supply board 315 may be a printed circuit board supplying electric power to the display device 100. The power supply board 315 may convert AC power into DC power.

The power supply board 315 may supply an electric current to the light assembly 124 through the wire electrode 232. The power supply board 315 may be electrically connected to a main board 321 through the wire electrode 232. The main board 321 may be spaced apart from the power supply board 315 by a predetermined distance.

The main board 321 may be a printed circuit board providing an interface for operating the display device 100. Further, the main board 321 may check and control an operation state of each of the components of the display device 100.

The power supply board 315 and the main board 321 may be electrically connected to a timing controller board 319 through the wire electrode 232. The timing controller board 319 may be a printed circuit board transmitting electric power or signals received from the power supply board 315 or the main board 321 to the display panel 110. The timing controller board 319 may be electrically connected to the display panel 110 positioned in front of the frame 130 through flat flexible cables 251.

FIG. 5 illustrates that the printed circuit boards are connected to one another, by way of example. However, embodiments are not limited thereto. For example, only at least a portion of each printed circuit board may be connected to one another.

FIGS. 6 to 9 illustrate examples of a frame according to one embodiment.

Figure 6:
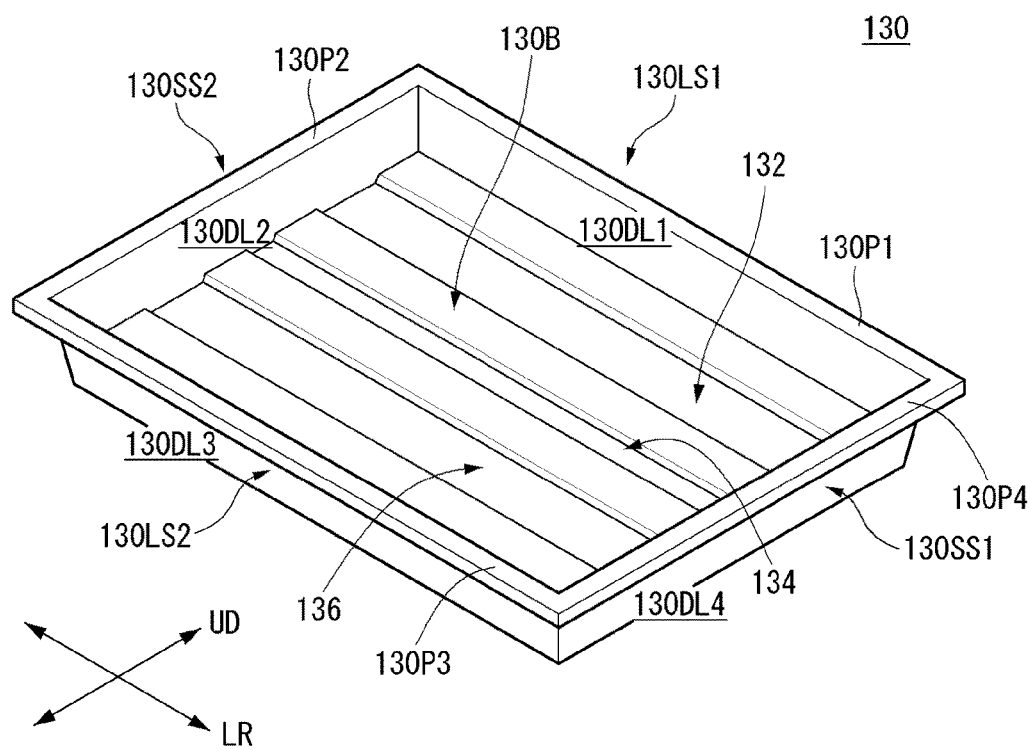
FIGS. 6, 7A, 7B, 8 and 9 illustrate examples of a frame according to one embodiment.

Referring to FIG. 6, the frame 130 may provide a space for accommodating the above-described components or components to be described later. The frame 130 may include a flat portion 130B, an inclined portion 130DL, and a flange 130P. One plate may be pressed to form the flat portion 130B, the inclined portion 130DL, and the flange 130P of the frame 130.

The flat portion 130B may form an entire bottom of the frame 130. The flat portion 130B may be bent or stepped to provide rigidity for the frame 130. Alternatively, the flat portion 130B may have a stepped portion to support or fix the components.

The frame 130 may have trenches 132, 134 and 136. The trenches 132, 134 and 136 may be formed on the flat portion 130B. Each of the trenches 132, 134 and 136 may be formed on the flat portion 130B in the left-right direction LR. The trenches 132, 134 and 136 may be formed by pressing the frame 130 or the flat portion 130B.

The plurality of trenches 132, 134 and 136 may be formed. The plurality of trenches 132, 134 and 136 may be arranged in the up-down direction UD. For example, the first trench 134 may be formed in the center of the flat portion 130B. The second trench 132 may be formed on the flat portion 130B above the first trench 134. The third trench 136 may be formed on the flat portion 130B below the first trench 134.

The first trench 134 may have a different width from the second trench 132 and/or the third trench 136. A width of the second trench 132 may be the same as or similar to a width of the third trench 136. Namely, one of the plurality of trenches 132, 134 and 136 may have a different width from another of the plurality of trenches 132, 134 and 136.

The inclined portion 130DL may be extended from an edge of the flat portion 130B. The inclined portion 130DL may include a plurality of inclined portions 130DL1 to 130DL4, and the plurality of inclined portions 130DL1 to 130DL4 may be extended from edges of the flat portion 130B. For example, the first inclined portion 130DL1 may be extended from the upper edge of the flat portion 130B, the second inclined portion 130DL2 may be extended from the left edge of the flat portion 130B, the third inclined portion 130DL3 may be extended from the lower edge of the flat portion 130B, and the fourth inclined portion 130DL4 may be extended from the right edge of the flat portion 130B. In this instance, the plurality of inclined portions 130DL1 to 130DL4 may have different inclinations.

The flange 130P may be extended from the inclined portion 130DL. For example, a first flange 130P1 may be extended from the first inclined portion 130DL1, a second flange 130P2 may be extended from the second inclined portion 130DL2, a third flange 130P3 may be extended from the third inclined portion 130DL3, and a fourth flange 130P4 may be extended from the fourth inclined portion 130DL4.

Figure 7A:
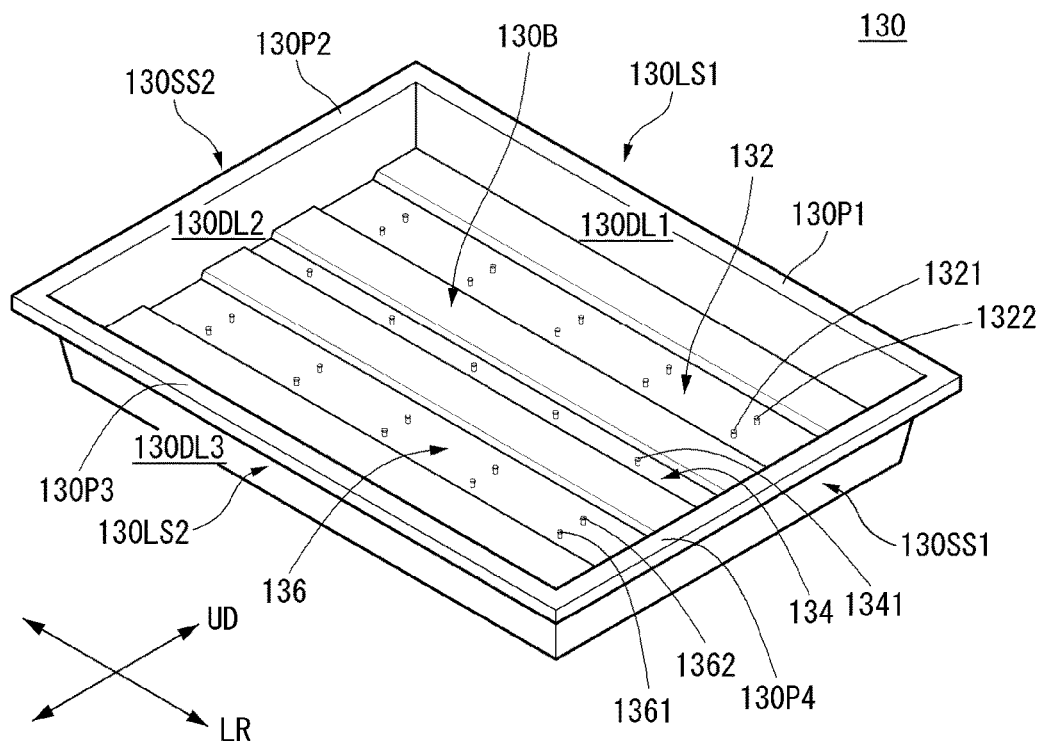

Referring to FIG. 7A, a projection may be positioned in the trenches 132, 134 and 136. A plurality of projections may be positioned in the trenches 132, 134 and 136. In this instance, a number of projections may vary depending on a position of the trenches 132, 134 and 136 in the flat portion 130B.

For example, the first trench 134 may include a row of projections 1341 that are sequentially arranged in the left-right direction LR. The second trench 132 may include two rows of projections 1321 and 1322 that are sequentially arranged in the left-right direction LR. The third trench 136 may include two rows of projections 1361 and 1362 that are sequentially arranged in the left-right direction LR.

Figure 7B:
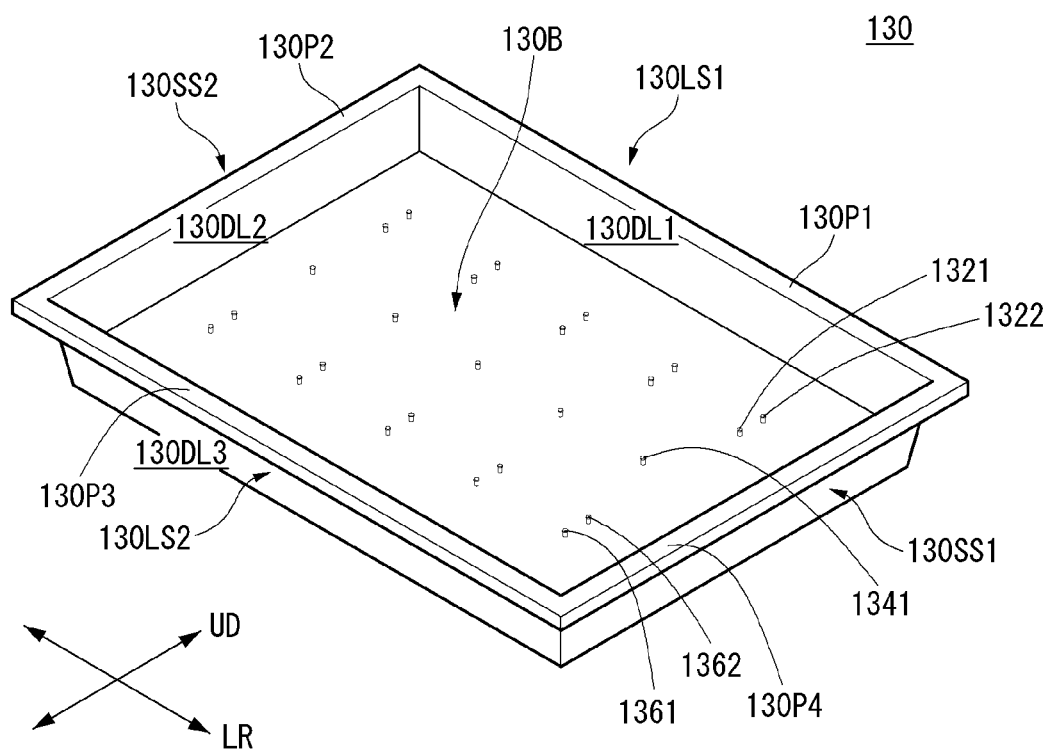

Referring to FIG. 7B, a projection may be positioned in the flat portion 130B. A plurality of projections may be positioned in the flat portion 130B. Namely, the projections illustrated in FIG. 7A may be arranged in the flat portion 130B from which the trenches 132, 134 and 136 are removed.

A first row of projections 1322 may be arranged adjacent to the first inclined portion 130DL1 along the first inclined portion 130DL1 or a first long side 130LS1 of the frame 130. A second row of projections 1321 may be arranged adjacent to the first row of projections 1322 along the first inclined portion 130DL1 or the first long side 130LS1 of the frame 130.

A fourth row of projections 1361 may be arranged adjacent to the third inclined portion 130DL3 along the third inclined portion 130DL3 or a second long side 130LS2 of the frame 130. A fifth row of projections 1362 may be arranged adjacent to the fourth row of projections 1361 along the third inclined portion 130DL3 or the first long side 130LS1 of the frame 130.

A third row of projections 1341 may be arranged between the second row of projections 1321 and the fifth row of projections 1362 along the first and second long sides 130LS1 and 130LS2 of the frame 130 or the left-right direction LR. In this instance, the third row of projections 1341 may be arranged in the center of the flat portion 130B of the frame 130 along the left-right direction LR of the frame 130.

Figure 8:
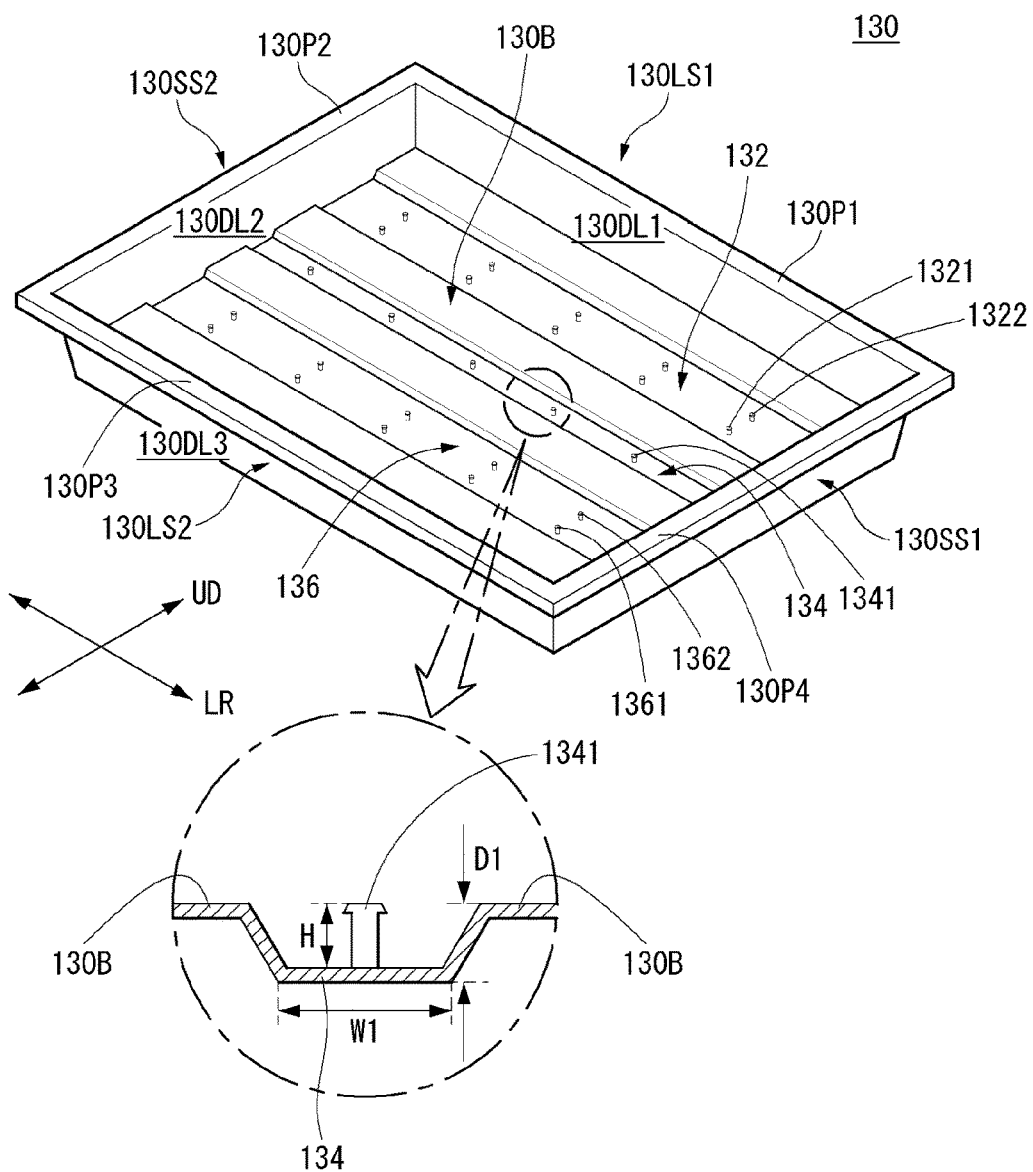

Referring to FIG. 8, a projection 1341 may be formed in the first trench 134. A plurality of projections 1341 may be sequentially formed along a longitudinal direction (i.e., the left-right direction LR) of the first trench 134. The first trench 134 may have a predetermined width W1 and a predetermined depth D1, and the projection 1341 may have a predetermined height H. The height H of the projection 1341 may correspond to the depth D1 of the first trench 134. Namely, the height H of the projection 1341 may be substantially the same as the depth D1 of the first trench 134. The projection 1341 may be positioned in the center (based on the up-down direction UD) of a bottom surface of the first trench 134.

Figure 9:
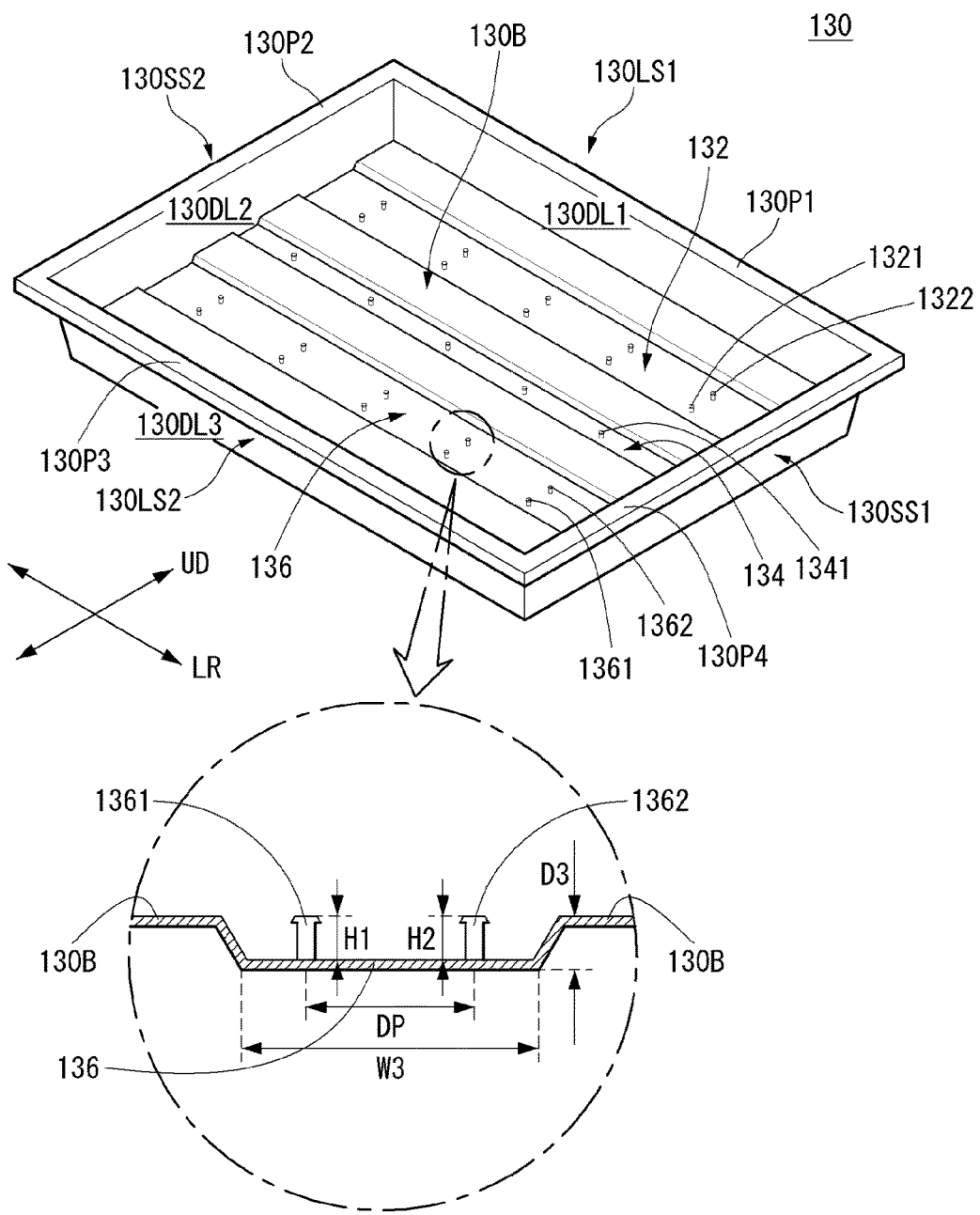

Referring to FIG. 9, the third trench 136 may have a predetermined width W3 and a predetermined depth D3. The predetermined depth D3 of the third trench 136 may be equal to or slightly different from the depth D1 of the first trench 134. The width W3 of the third trench 136 may be different from the width W1 of the first trench 134. The width W3 of the third trench 136 may be greater than the width W1 of the first trench 134. For example, the width W3 of the third trench 136 may be more than two times the width W1 of the first trench 134.

Projections 1361 and 1362 may be sequentially formed along a longitudinal direction (i.e., the left-right direction LR) of the third trench 136. In this instance, the projections 1361 and 1362 may be arranged in a plurality of rows. The projections 1361 and 1362 may be formed in pairs. The projections 1361 and 1362 may form a pair, and a plurality of pairs of projections 1361 and 1362 may be sequentially formed along the longitudinal direction of the third trench 136.

A pair of projections 1361 and 1362 may be arranged in a width direction (i.e., the up-down direction UD) of the third trench 136. Namely, one projection 1362 of the pair of projections 1361 and 1362 may be formed close to the first trench 134 on a bottom surface of the third trench 136, and the other projection 1361 may be formed close to the third inclined portion 130DL3 on the bottom surface of the third trench 136. A distance DP between the pair of projections 1361 and 1362 may be more than two times a half of a width of the substrate 122 described above or below.

The description of the third trench 136 may be equally applied to the second trench 132.

FIGS. 10 to 17 illustrate examples of coupling light sources according to one embodiment.

Figure 10:
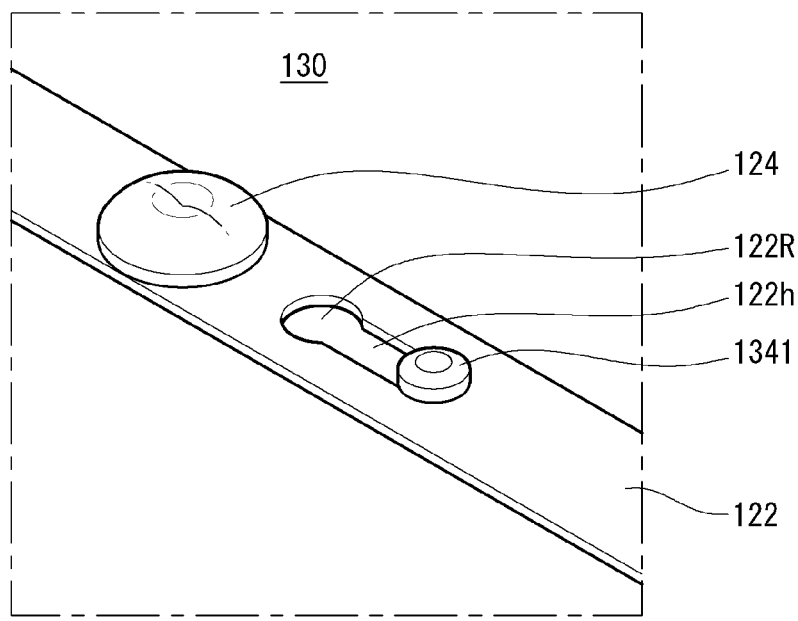
FIGS. 10, 11, 12, 13, 14, 15, 16 and 17 illustrate examples of the coupling of light sources according to one embodiment.
Figure 11:
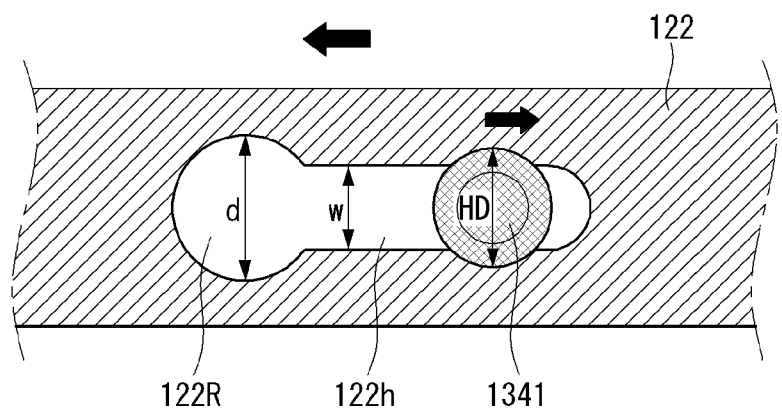

Referring to FIGS. 10 and 11, a coupling groove 122h may be formed on the substrate 122. The coupling groove 122h may be formed in an elongated shape on the substrate 122. The coupling groove 122h may be extended along a longitudinal direction of the substrate 122. The coupling groove 122h may have a circular insertion groove 122R at one end.

A projection 1341 may have a head HD smaller than a diameter d of the insertion groove 122R. The head HD of the projection 1341 may be formed to be larger than a width w of the coupling groove 122h. Hence, the projection 1341 may be inserted into the insertion groove 122R and may couple the substrate 122 to the frame 130 while sliding along the coupling groove 122h.

Figure 12:
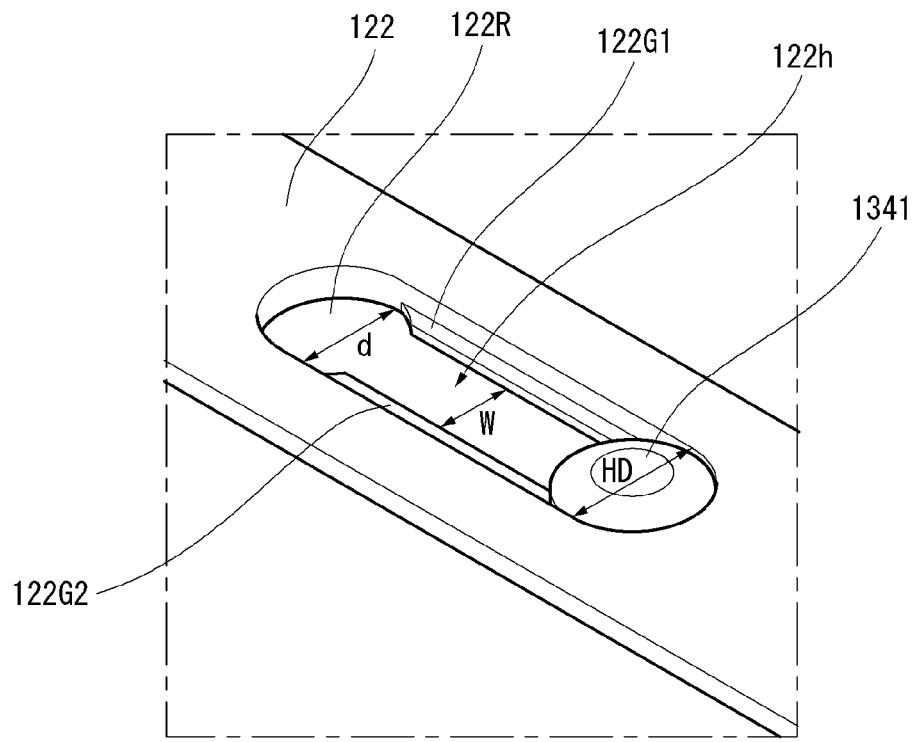

Referring to FIG. 12, a coupling groove 122h may be formed on the substrate 122. The coupling groove 122h may be formed in an elongated shape on the substrate 122. The coupling groove 122h may be extended along the longitudinal direction of the substrate 122. The coupling groove 122h may have a circular insertion groove 122R at one end.

The coupling groove 122h may include guides 122G1 and 122G2. The guides 122G1 and 122G2 may be formed inside the coupling groove 122h. The first guide 122G1 may protrude from an inner surface of the coupling groove 122h and may be formed along a longitudinal direction of the coupling groove 122h. The second guide 122G2 may face the first guide 122G1. In this instance, the second guide 122G2 may protrude from the inner surface of the coupling groove 122h and may be formed along the longitudinal direction of the coupling groove 122h.

A projection 1341 may have a head HD smaller than a diameter d of the insertion groove 122R. The head HD of the projection 1341 may be formed to be larger than a width w of the coupling groove 122h formed by the guides 122G1 and 122G2. Hence, the projection 1341 may be inserted into the insertion groove 122R and may couple the substrate 122 to the frame 130 while sliding along the coupling groove 122h and the guides 122G1 and 122G2.

Figure 13:
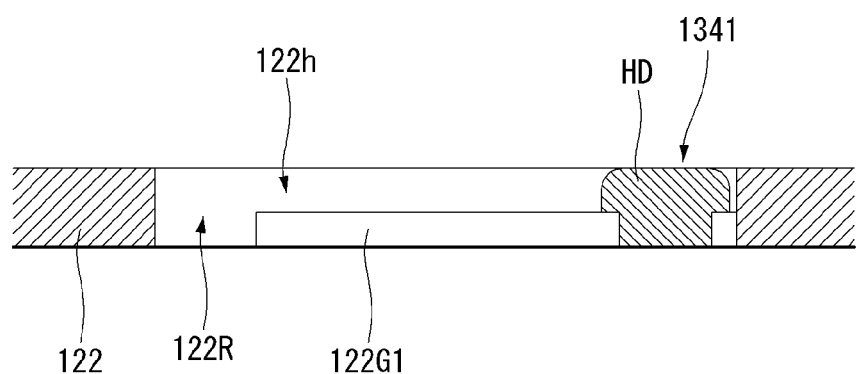

Referring to FIG. 13, a projection 1341 may not protrude to the outside of the substrate 122 and may be positioned inside a coupling groove 122h. A head HD of the projection 1341 may be positioned on an upper surface of a first guide 122G1. The head HD of the projection 1341 may contact a portion of the upper surface of the first guide 122G1. Hence, the reflective sheet 126 described above or below may be placed flat on the substrate 122. A height of the projection 1341 may be equal to or less than a thickness of the substrate 122.

Figure 14:
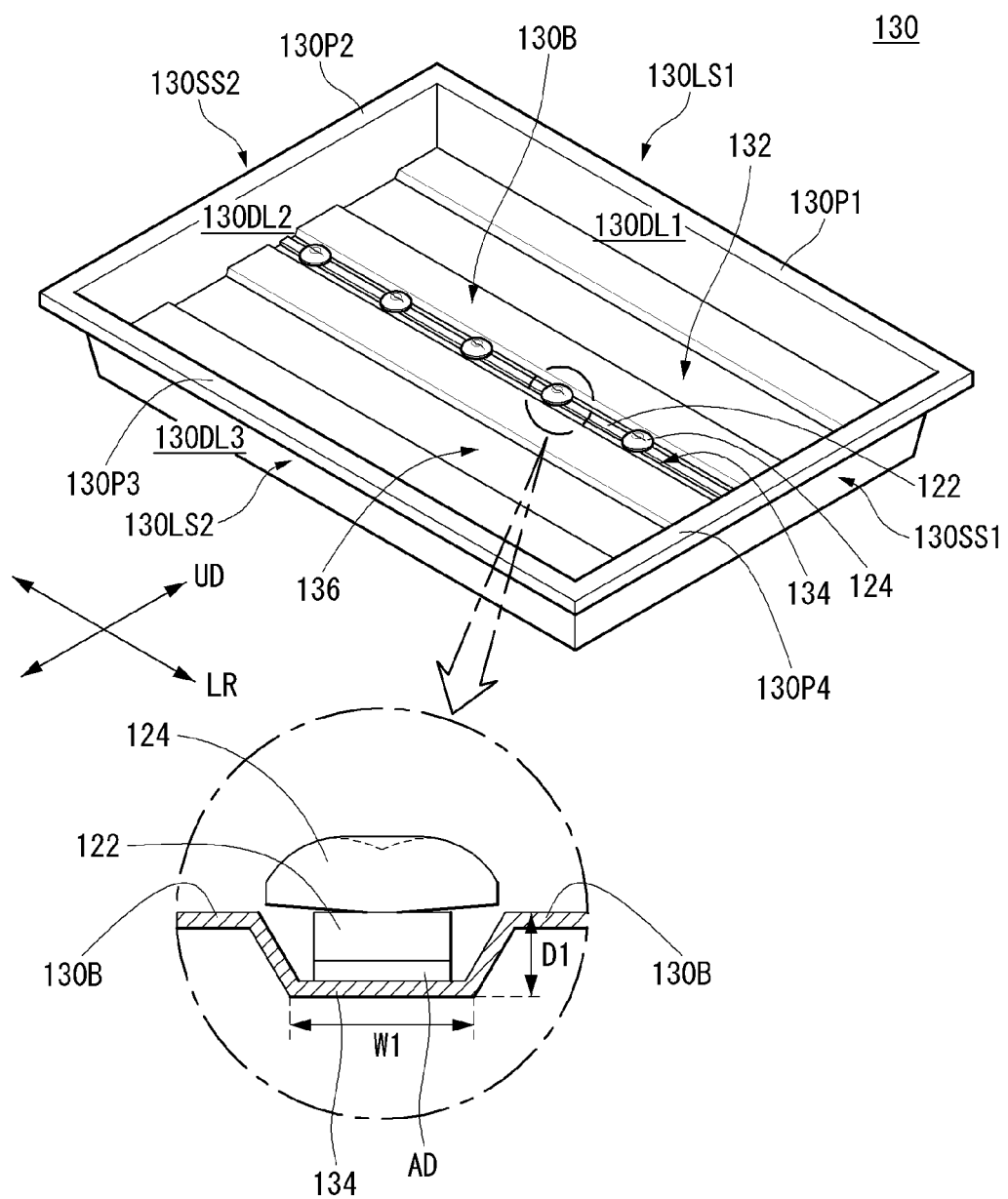

Referring to FIG. 14, the substrate 122 and/or the light assembly 124 may be positioned in the first trench 134. A depth D1 of the first trench 134 may be substantially the same as the thickness of the substrate 122. The substrate 122 and/or the light assembly 124 may be fixed or attached to the first trench 134. An adhesive member AD may fix or attach the substrate 122 to the first trench 134. For example, the adhesive member AD may be a double-sided tape. The depth D1 of the first trench 134 may be substantially the same as a sum of thicknesses of the substrate 122 and the adhesive member AD. Namely, the light assembly 124 may seem to be placed on the flat portion 130B of the frame 130 when viewed from the side. The first trenches 134 may have a depth capable of accommodating the substrate 122 and/or the adhesive member AD.

A width W1 of the first trench 134 may be substantially equal to or greater than the width of the substrate 122. The width W1 of the first trench 134 may be substantially equal to or less than an outer diameter of the light assembly 124.

Figure 15:
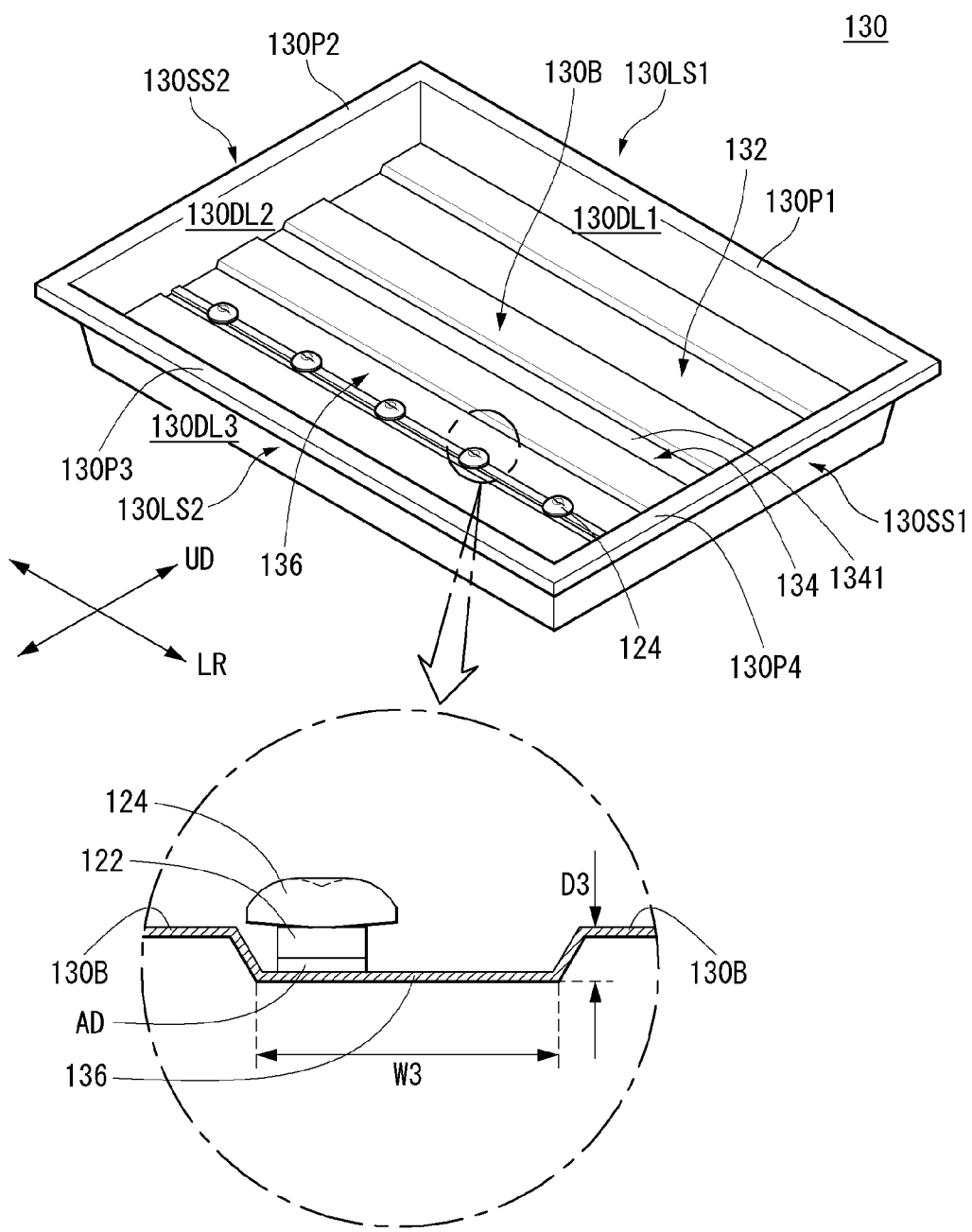

Referring to FIG. 15, the third trench 136 may provide a space capable of accommodating the plurality of substrates 122. The third trench 136 may have an area capable of arranging the plurality of the substrates 122 at one time.

In this instance, the substrate 122 and/or the light assembly 124 may be biased to one side in an entire portion of the third trench 136. Namely, a position of the substrate 122 and/or the light assembly 124 on the third trench 136 may be changed.

The substrate 122 and/or the light assembly 124 on the third trench 136 may be disposed closer to the first trench 134. Alternatively, the substrate 122 and/or the light assembly 124 on the third trench 136 may be disposed closer to the third inclined portion 130DL3. This means that a distance between the light sources of the backlight unit can be adjusted.

For example, the substrate 122 and/or the light assembly 124 may be extended in the left-right direction LR and may be biased to an upper side of the third trench 134 based on the up-down direction UD. Alternatively, the substrate 122 and/or the light assembly 124 may be biased to a lower side of the third trench 134 based on the up-down direction UD.

Figure 16:
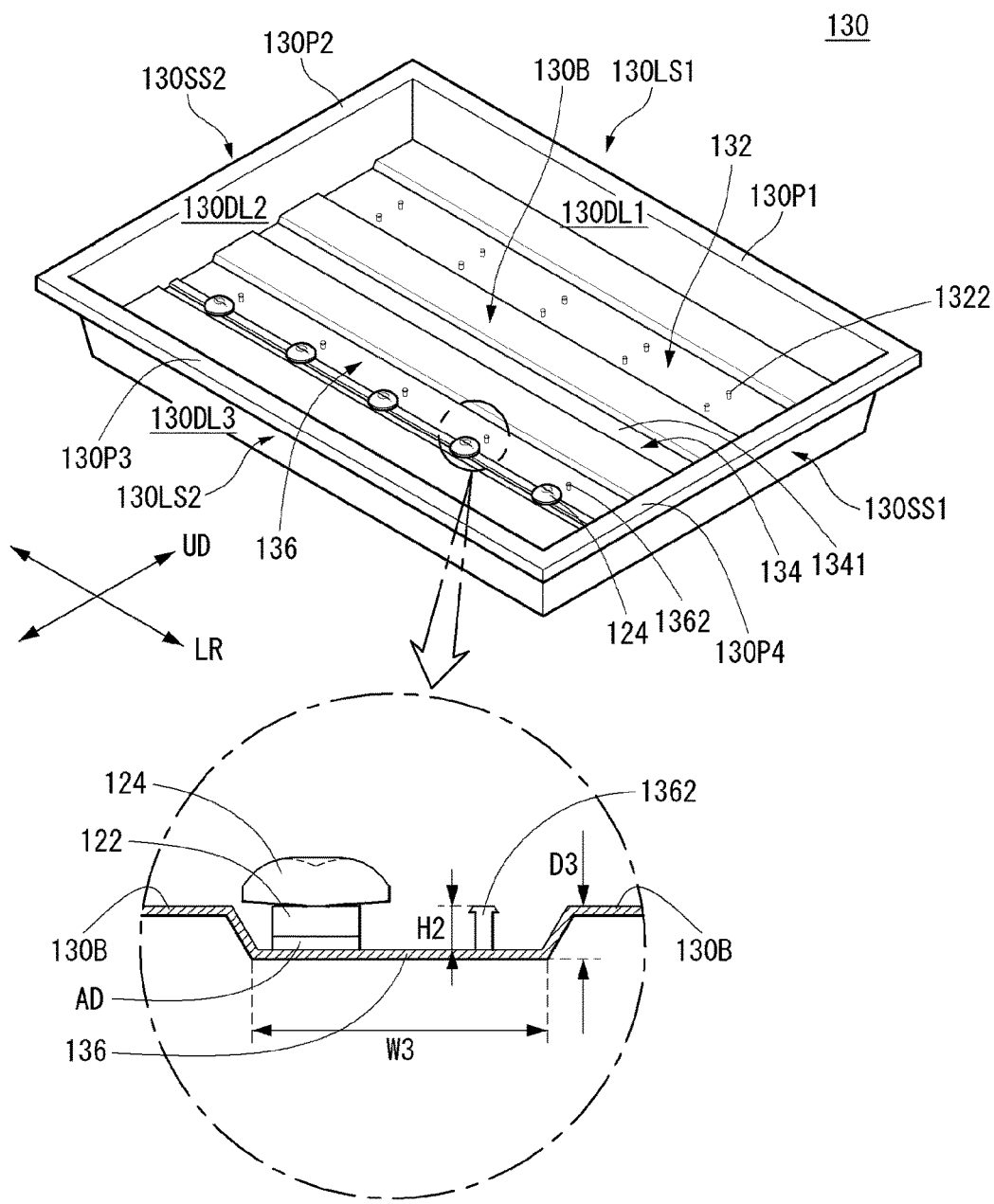

Referring to FIG. 16, projections 1361 and 1362 may be positioned on the third trench 136. The projections 1361 and 1362 may protrude from a bottom surface of the third trench 136. The first projection 1361 may be positioned on the third trench 136 close to the third inclined portion 130DL3, and the second projection 1362 may be positioned on the third trench 136 close to the first trench 134. Namely, the first projection 1361 and the second projection 1362 may be positioned sequentially or in series in the up-down direction UD.

When the substrate 122 and/or the light assembly 124 are/is coupled to the third trench 134, the substrate 122 may be inserted into the first projection 1361. The second projection 1362 may be positioned next to the substrate 122 and/or the light assembly 124 and may protrude from the bottom surface of the third trench 136. Namely, the substrate 122 may be inserted into or coupled to the first projection 1361 or the second projection 1362.

Figure 17:
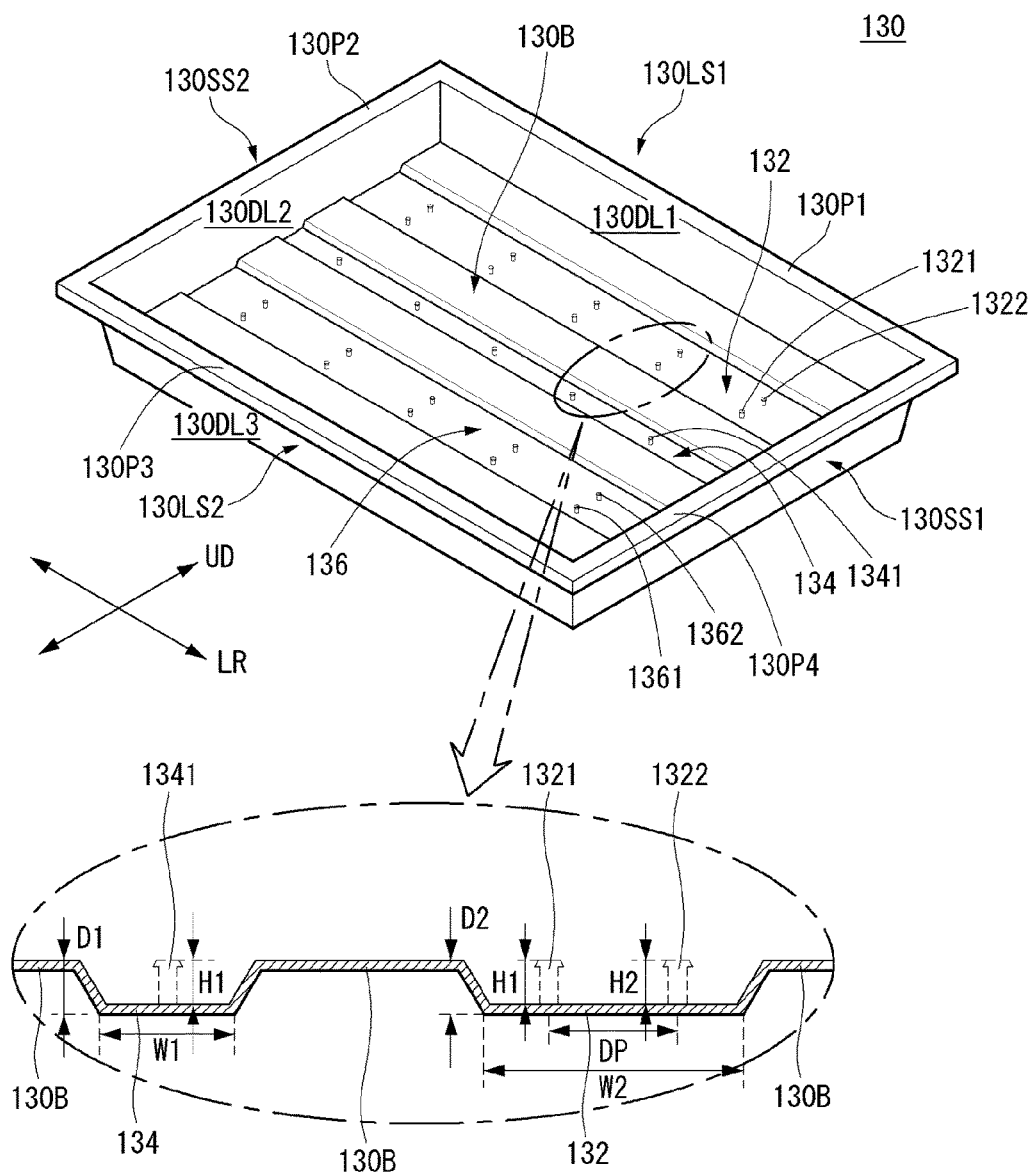

Referring to FIG. 17, the first trench 134 may include a row of projections 1341. The row of projections 1341 may seem like one projection when viewed from a cross-section of the frame 130. The second trench 132 may include two rows of projections 1321 and 1322. The two rows of projections 1321 and 1322 may seem like two projections when viewed from the cross-section of the frame 130.

A height H1 of the first projection 1321 may be substantially the same as a height H2 of the second projection 1322. A depth D2 of the second trench 132 may be substantially the same as the height H1 of the first projection 1321. A distance DP between the first projection 1321 and the second projection 1322 may be larger than the width of the substrate 122.

FIGS. 18 to 21 illustrate examples of a frame according to one embodiment.

Figure 18:
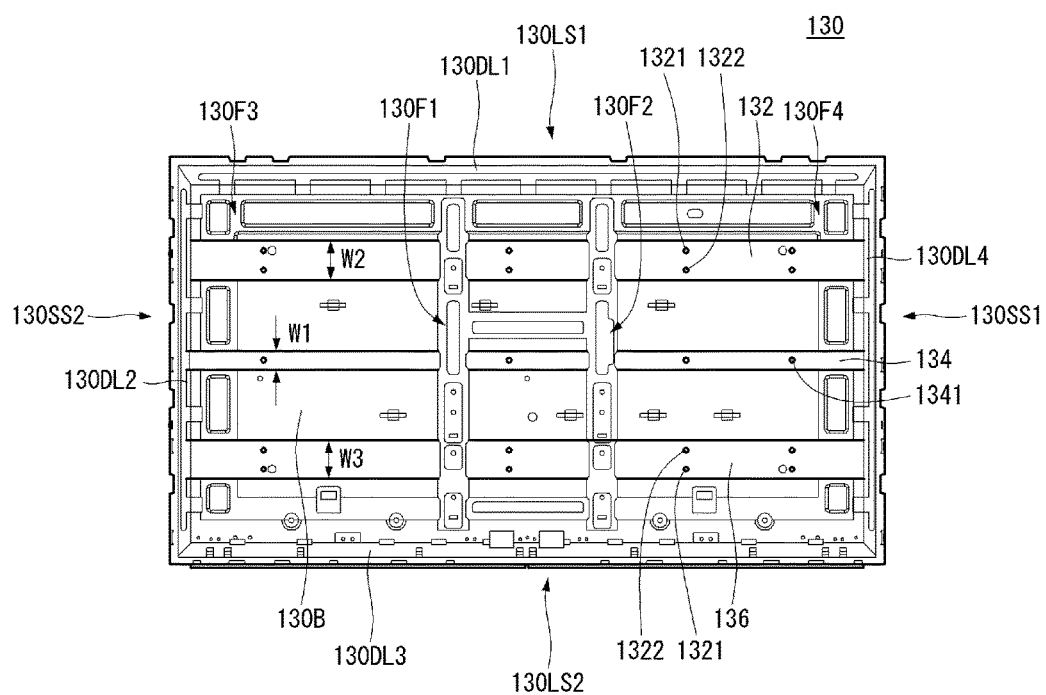
FIGS. 18, 19, 20 and 21 illustrate examples of a frame according to one embodiment.
Figure 19:
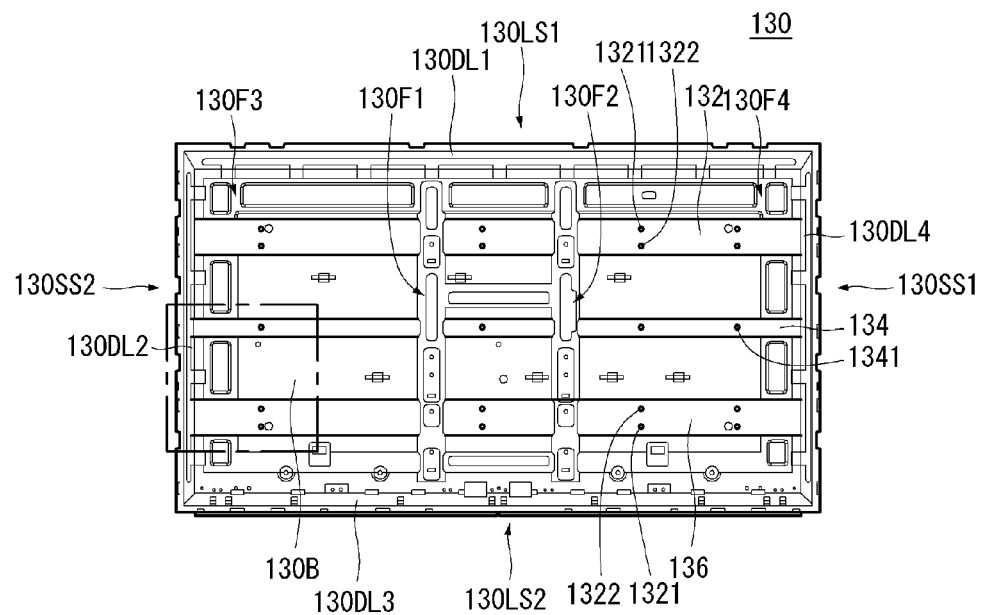
Figure 19:
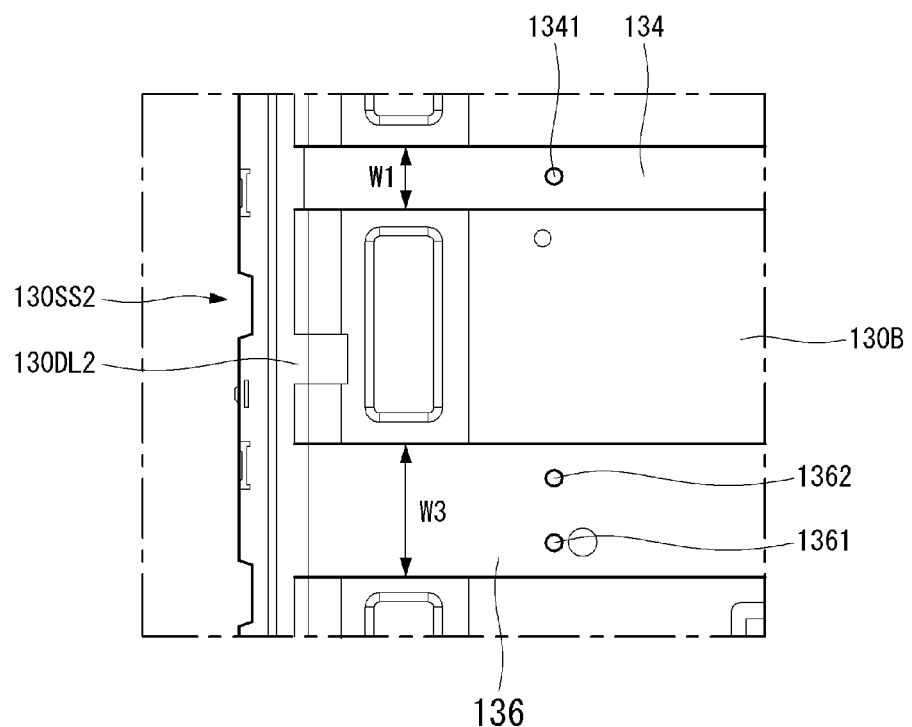

Referring to FIG. 18, the frame 180 may include a skeleton 130F. The skeleton 130F may be formed in a portion of the frame 130 in the up-down direction UD. The skeleton 130F of the frame 130 may be formed on the flat portion 130B of the frame 130 by a press.

The frame 180 may include a plurality of skeletons 130F. A first skeleton 130F1 and a second skeleton 130F2 may be disposed in the center of the flat portion 130B of the frame 130. The first skeleton 130F1 may be positioned in parallel with the second skeleton 130F2. A third skeleton 130F3 and a fourth skeleton 130F4 may be disposed on the side of the flat portion 130B of the frame 130. The third skeleton 130F3 may be positioned in parallel with the fourth skeleton 130F4.

The trenches 132, 134 and 136 may cross the skeletons 130F. In this instance, the skeletons 130F crossing the trenches 132, 134 and 136 may be further retracted to the rear of the flat portion 130B of the frame 130. A height difference formed by the flat portion 130B of the frame 130 and the skeletons 130F may be more than a height difference formed by the flat portion 130B of the frame 130 and the trenches 132, 134 and 136. Hence, the skeletons 130F may not affect the flatness of the substrate 122 coupled to the trenches 132, 134 and 136.

Figure 20:
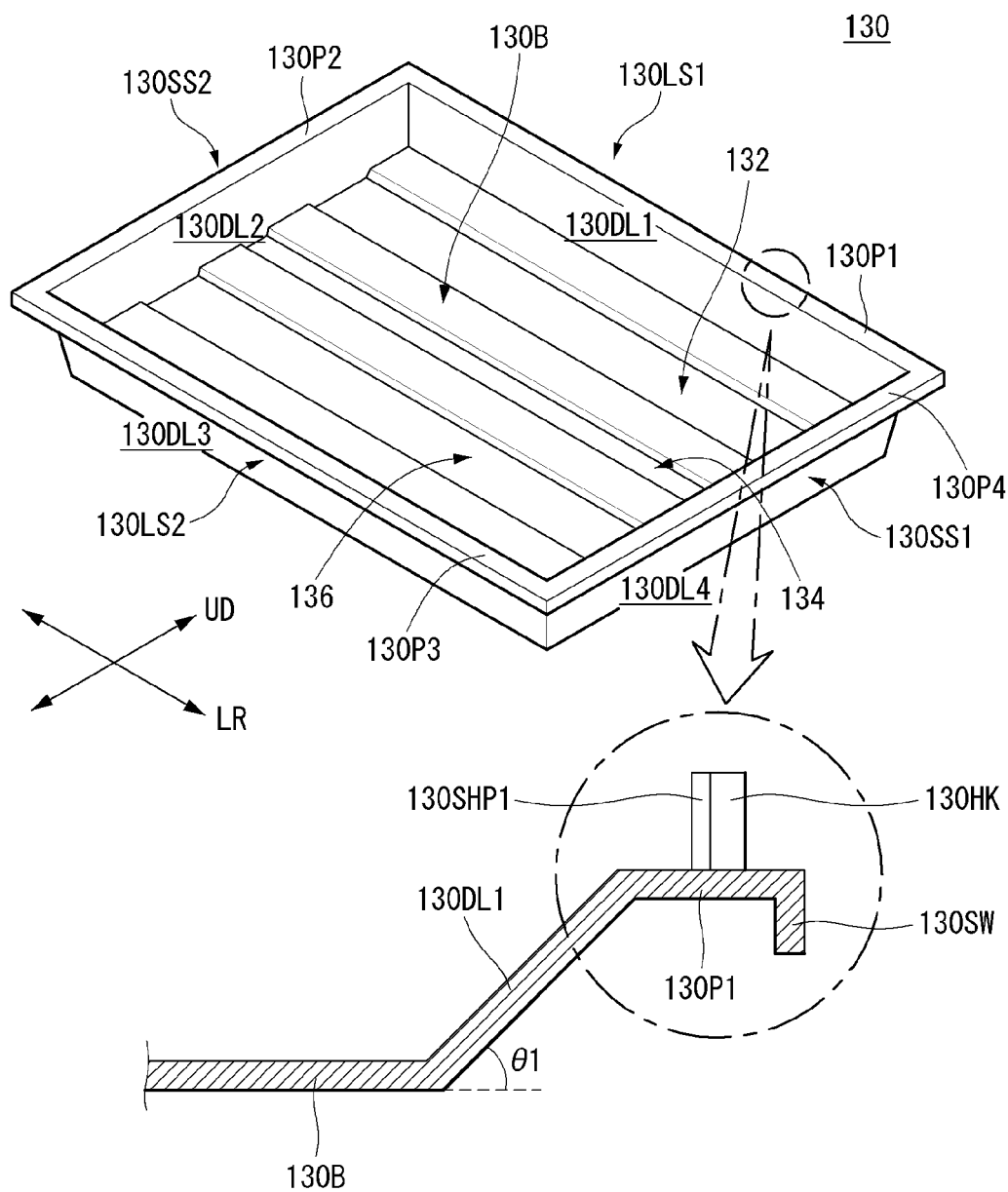

Referring to FIG. 20, the frame 130 may include a flat portion 130B, an inclined portion 130DL1, a flange 130P1, and a sidewall 130SW. The inclined portion 130DL1 of the frame 130 may form a predetermined angle θ1 with the flat portion 130B of the frame 130. For example, the predetermined angle θ1 may be 45 degrees. In this instance, the inclined portion 130DL1 may be a first inclined portion 130DL1.

The frame 130 may include a support portion 130SHP1 and a hook portion 130HK. The support portion 130SHP1 may be formed on the flange 130P1 of the frame 130. The hook portion 130HK may be formed on the flange 130P1 of the frame 130. In this instance, the flange 130P1 may be a first flange 130P1. The support portion 130SHP1 and the hook portion 130HK may seem to overlap each other when viewed from a cross section of the frame 130. In this instance, the support portion 130SHP1 may further protrude to the inside of the frame 130 than the hook portion 130HK. Namely, the inclined portion 130DL1 may be closer to the support portion 130SHP1 than the hook portion 130HK.

The support portion 130SHP1 (or 130SH) may be referred to as a first rib. The hook portion 130HK may be referred to as a second rib.

Figure 21:
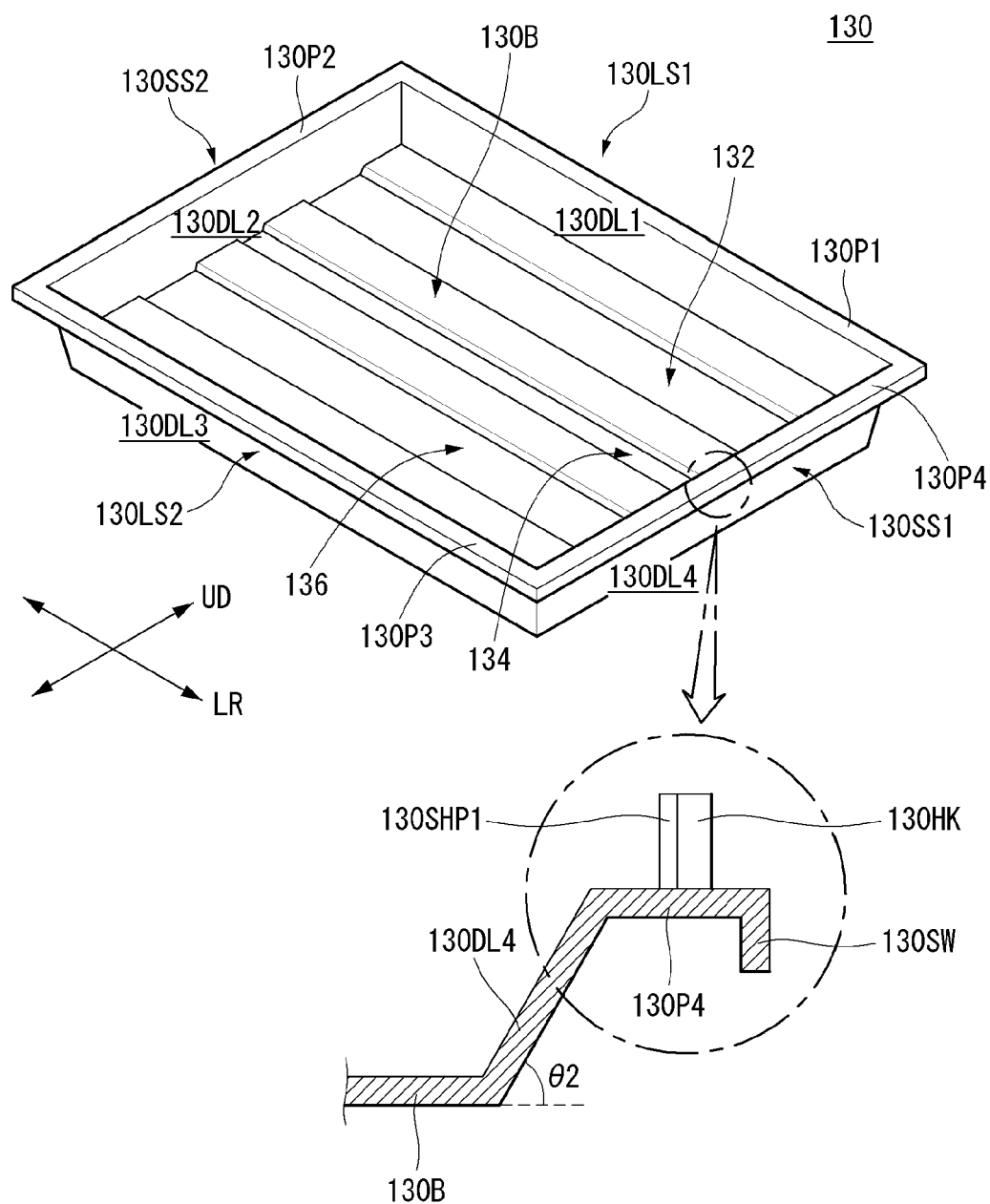

Referring to FIG. 21, the frame 130 may include a flat portion 130B, an inclined portion 130DL4, a flange 130P4, and a sidewall 130SW. The inclined portion 130DL4 of the frame 130 may form a predetermined angle θ2 with the flat portion 130B of the frame 130. For example, the predetermined angle θ2 may be 60 degrees. In this instance, the inclined portion 130DL4 may be a fourth inclined portion 130DL4. In addition, the inclined portion 130DL4 may be a second inclined portion 130DL2 or a third inclined portion 130DL3.

The frame 130 may include a support portion 130SHP4 and a hook portion 130HK. The support portion 130SHP1 may be formed on the flange 130P4 of the frame 130. The hook portion 130HK may be formed on the flange 130P4 of the frame 130. In this instance, the flange 130P4 may be a fourth flange 130P4. In addition, the flange 130P4 may be a second flange 130P2 or a third flange 130P3.

The support portion 130SHP1 and the hook portion 130HK may seem to overlap each other when viewed from a cross section of the frame 130. In this instance, the support portion 130SHP1 may further protrude to the inside of the frame 130 than the hook portion 130HK. Namely, the inclined portion 130DL4 may be closer to the support portion 130SHP1 than the hook portion 130HK.

FIGS. 22 to 29 illustrate examples of the arrangement of light sources according to one embodiment.

Figure 22:
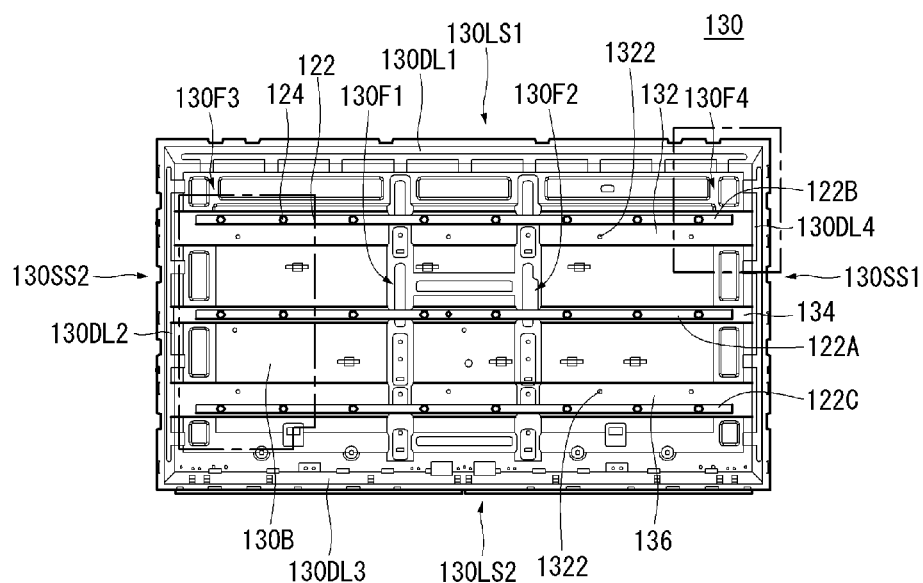
FIGS. 22, 23, 24, 25, 26, 27, 28 and 29 illustrate examples of the arrangement of light sources according to one embodiment.
Figure 22:
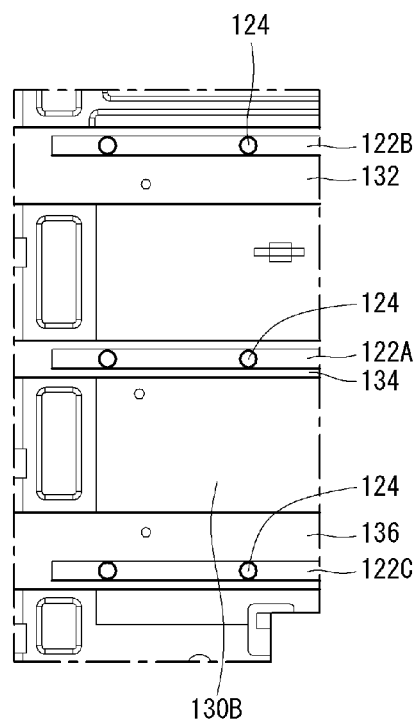

Referring to FIG. 22, a first substrate 122A may be disposed on the first trench 134. A second substrate 122B may be disposed on the second trench 132. A third substrate 122C may be disposed on the third trench 136. The first substrate 122A, the second substrate 122B, and the third substrate 122C may be sequentially arranged in the up-down direction of the frame 130.

The second substrate 122B may be disposed on the upper side of the second trench 132. In other words, the second substrate 122B may be disposed on the second trench 132 at a location close to a first inclined portion 130DL1. The third substrate 122C may be disposed on the lower side of the third trench 136. In other words, the third substrate 122C may be disposed on the third trench 136 at a location close to a third inclined portion 130DL3.

The second substrate 122B and the third substrate 122C may be separated from each other as far as possible within a range allowed by the second and third trenches 132 and 136. The first substrate 122A may be disposed in the center of the second substrate 122B and the third substrate 122C. The light assemblies 124 may be sequentially disposed on each of the substrates 122A, 122B and 122GB in the left-right direction. Hence, light provided by the light assemblies 124 may be uniformly distributed.

Figure 23:
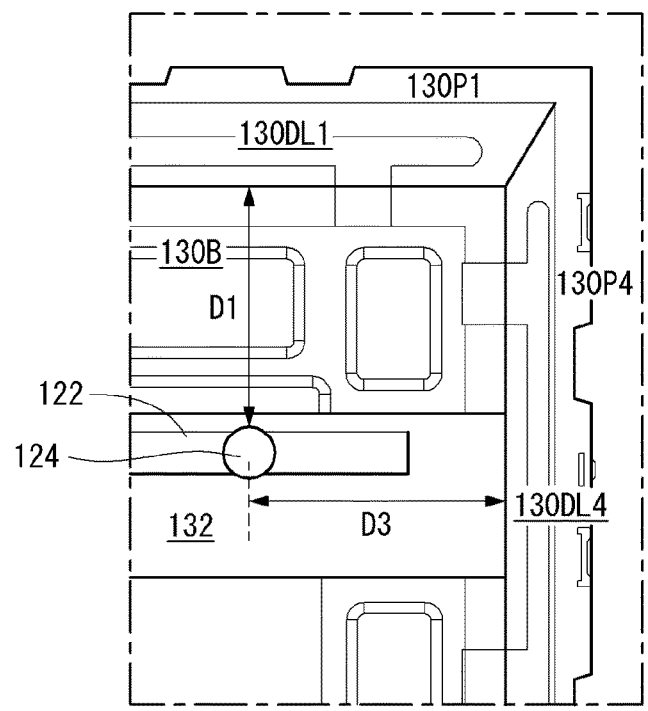

Referring to FIG. 23, the light assembly 124 may be spaced apart from the first inclined portion 130DL1 by a predetermined distance. The light assembly 124 may be spaced apart from the fourth inclined portion 130DL4 by a predetermined distance. The first inclined portion 130DL1 may form an inclination of about 45° with the flat portion 130B of the frame 130. The fourth inclined portion 130DL4 may form an inclination of about 60° with the flat portion 130B of the frame 130.

In this instance, the light assembly 124 that is spaced apart from the fourth inclined portion 130DL4, can provide the effective optical characteristics even at a distance from the fourth inclined portion 130DL4 owing to an angle formed by the fourth inclined portion 130DL4 and the flat portion 130B of the frame 130. Namely, as the fourth inclined portion 130DL4 has a relatively steep inclination, light generated in the light assembly 124 can be uniformly distributed without forming a dark portion around the fourth inclined portion 130DL4.

Namely, the light assembly 124 may be spaced apart from the first inclined portion 130DL1 by a distance D1 shorter than a separation distance D3 between the light assembly 124 and the fourth inclined portion 130DL4 based on an angle between the first inclined portion 130DL1 and the flat portion 130B of the frame 130. Namely, the distance D1 may be less than the distance D3.

As the first inclined portion 130DL1 has a relatively gentle inclination, light provided by the light assembly 124 may form a dark portion around the first inclined portion 130DL1. However, as the distance between the light assembly 124 and the first inclined portion 130DL1 decreases, the optical characteristics may be improved. Namely, even when the first inclined portion 130DL1 has the relatively gentle inclination, light generated in the light assembly 124 can be uniformly distributed without forming a dark portion around the first inclined portion 130DL1.

Figure 24:
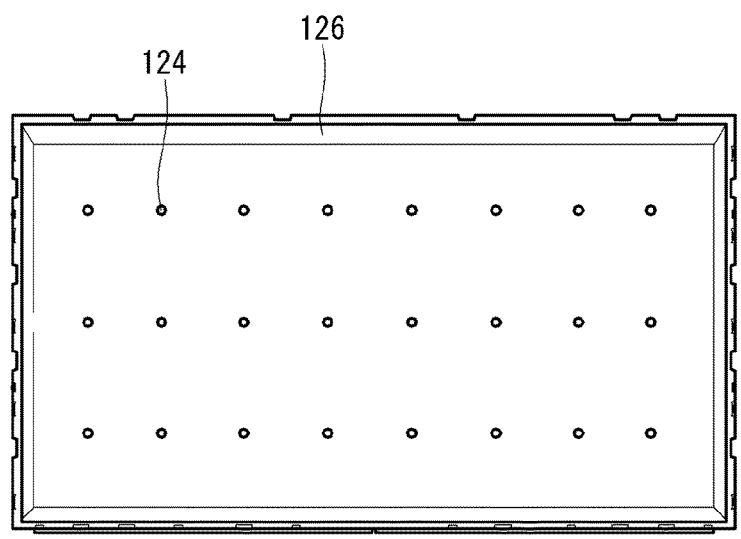

Referring to FIG. 24, the reflective sheet 126 may be positioned in front of the frame 130 and/or substrates 122A, 122B and 122C (see FIG. 23). The reflective sheet 126 may have through holes 235 (see FIG. 3). The upper part and/or the side of the light assembly 124 may be positioned on the front surface of the reflective sheet 126 through the through holes 235. FIG. 24 illustrates an example where the substrates 122A, 122B and 122C shown in FIG. 22 are disposed in three rows.

Figure 25:
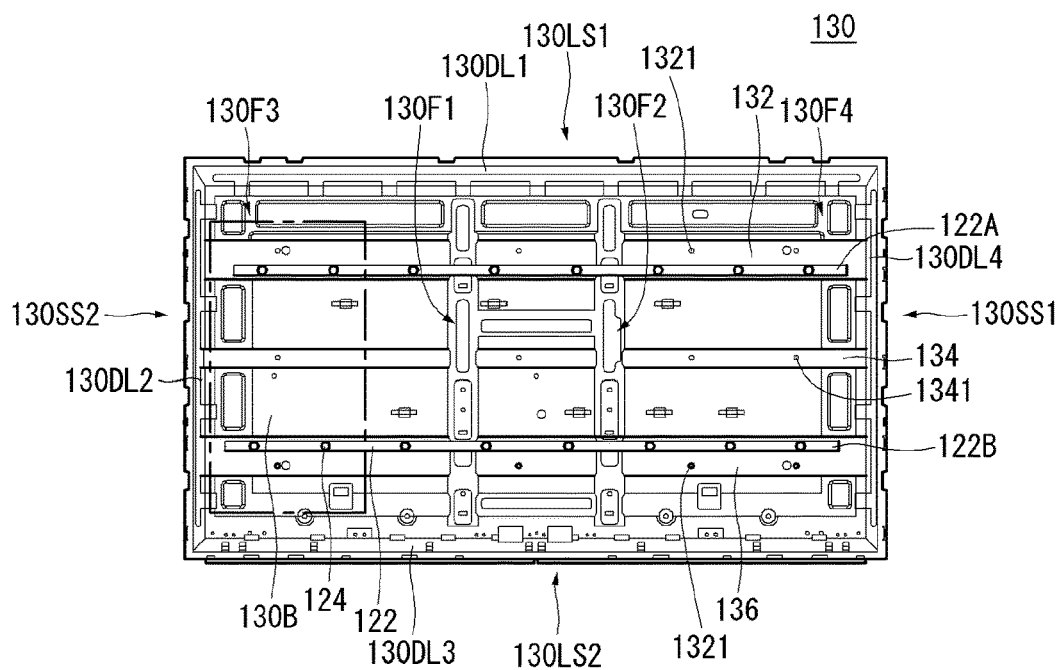
Figure 25:
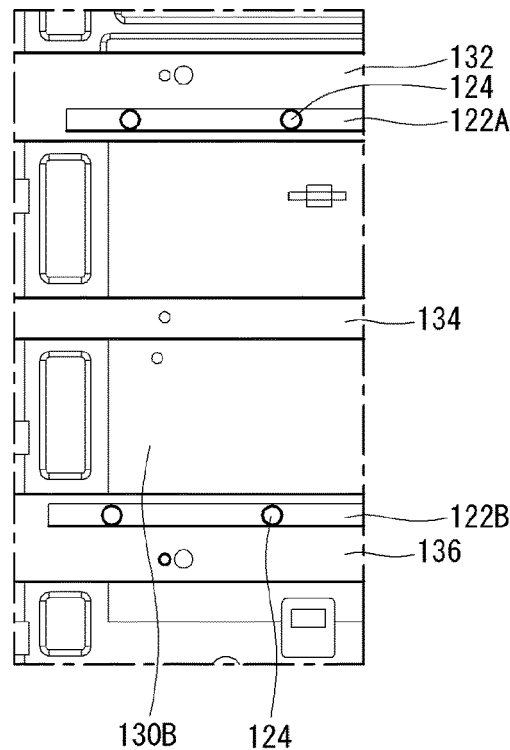

Referring to FIG. 25, a first substrate 122A may be disposed on the second trench 132, and a second substrate 122B may be disposed on the third trench 136. The first substrate 122A and the second substrate 122B may be sequentially arranged in the up-down direction of the frame 130.

The first substrate 122A may be disposed on the lower side of the second trench 132. In other words, the first substrate 122A may be disposed on the second trench 132 at a position away from the first inclined portion 130DL1. The second substrate 122B may be disposed on the upper side of the third trench 136. In other words, the second substrate 122B may be disposed on the third trench 136 at a position away from the third inclined portion 130DL3.

In another aspect, the first substrate 122A on the second trench 132 may be disposed as close as possible to the first trench 134, and the second substrate 122B on the third trench 136 may be disposed as close as possible to the first trench 134.

The first substrate 122A and the second substrate 122B may be disposed as close as possible to each other within a range allowed by the trenches 132 and 136. Further, the light assemblies 124 may be sequentially arranged on each substrate 122 in the left-right direction. Hence, although the substrate 122 and/or the light assembly 124 are omitted in the first trench 134, light provided by the light assemblies 124 can be uniformly distributed.

Figure 26:
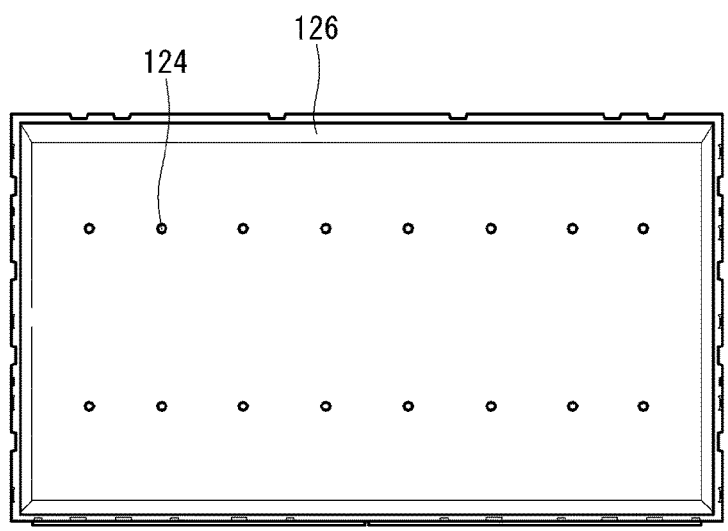

Referring to FIG. 26, the reflective sheet 126 may be positioned in front of the frame 130 and/or substrates 122A and 122B (see FIG. 25). The reflective sheet 126 may have through holes 235 (see FIG. 3). The upper part and/or the side of the light assembly 124 may be positioned on the front surface of the reflective sheet 126 through the through holes 235. FIG. 26 illustrates an example where the substrates 122A and 122B shown in FIG. 25 are disposed in two rows.

Figure 27:
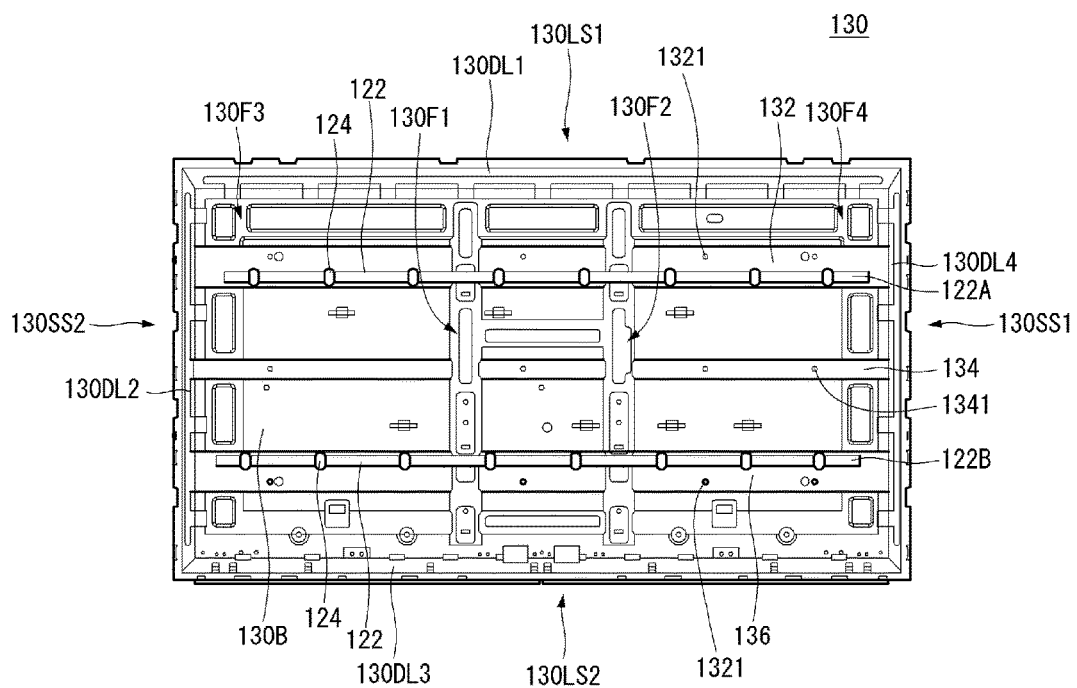
Figure 28:
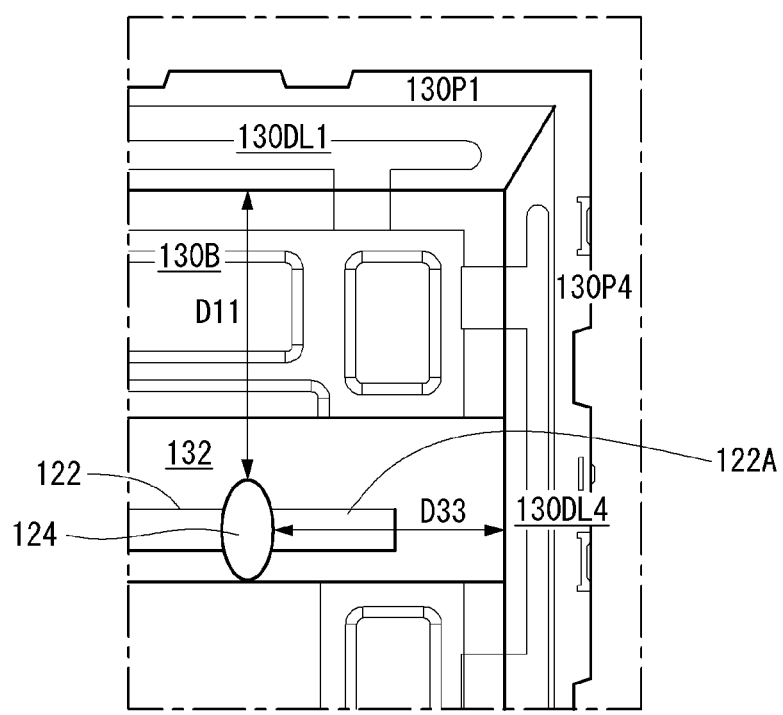

Referring to FIGS. 27 and 28, the first substrate 122A may be disposed on the lower side of the second trench 132, and the second substrate 122B may be disposed on the upper side of the third trench 136. The first substrate 122A and the second substrate 122B may be disposed as close as possible to each other inside the trenches 132 and 136.

The light assembly 124 may include a lens extended in the up-down direction UD. When the substrate 122A and/or the light assembly 124 are positioned on the lower side of the second trench 132, the light assembly 124 may be far from the first inclined portion 130DL1. When the light assembly 124 is far from the first inclined portion 130DL1, a dark portion may be formed around the first inclined portion 130DL1 by the first inclined portion 130DL1 having the relatively gentler inclination than the fourth inclined portion 130DL4.

In this instance, the light assembly 124 having the lens of a shape extended in the up-down direction UD can improve the optical characteristics around the first inclined portion 130DL1 in spite of a change in a position of the substrate 122A in the second trench 132. Namely, the light assembly 124 can maintain the uniform distribution of light around the first inclined portion 130DL1.

As the position of the substrate 122A changes, a distance D11 between the light assembly 124 and the first inclined portion 130DL1 and a distance D33 between the light assembly 124 and the fourth inclined portion 130DL4 may change. This change may lead to a change in the optical characteristics. The change in the optical characteristics may form a dark portion and a bright portion, causing the deterioration of image quality. Even when the position of the substrate 122A changes, the light assembly 124 can provide light with the uniform distribution for the first inclined portion 130DL1 and the fourth inclined portion 130DL4 owing to a change in the shape of the lens of the light assembly 124.

Figure 29:
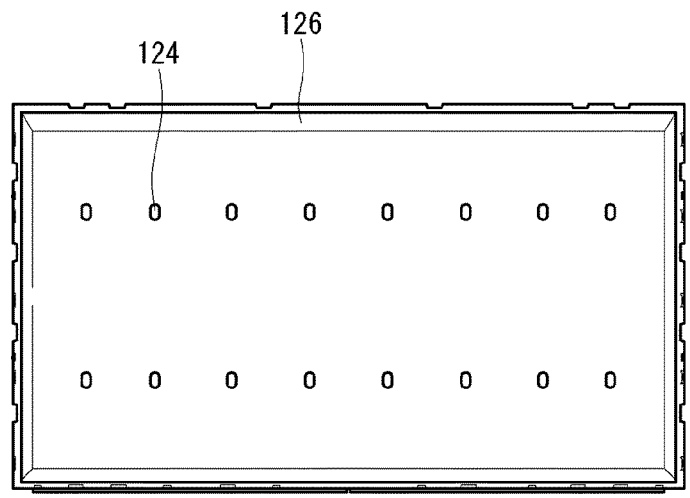

Referring to FIG. 29, the reflective sheet 126 may be positioned in front of the frame 130 and/or substrates 122A and 122B (see FIG. 27). The reflective sheet 126 may have through holes 235 (see FIG. 3). The upper part and/or the side of the light assembly 124 may be positioned on the front surface of the reflective sheet 126 through the through holes 235.

FIGS. 30 to 38 illustrate examples of the coupling and the arrangement of light sources according to one embodiment.

Figure 30:
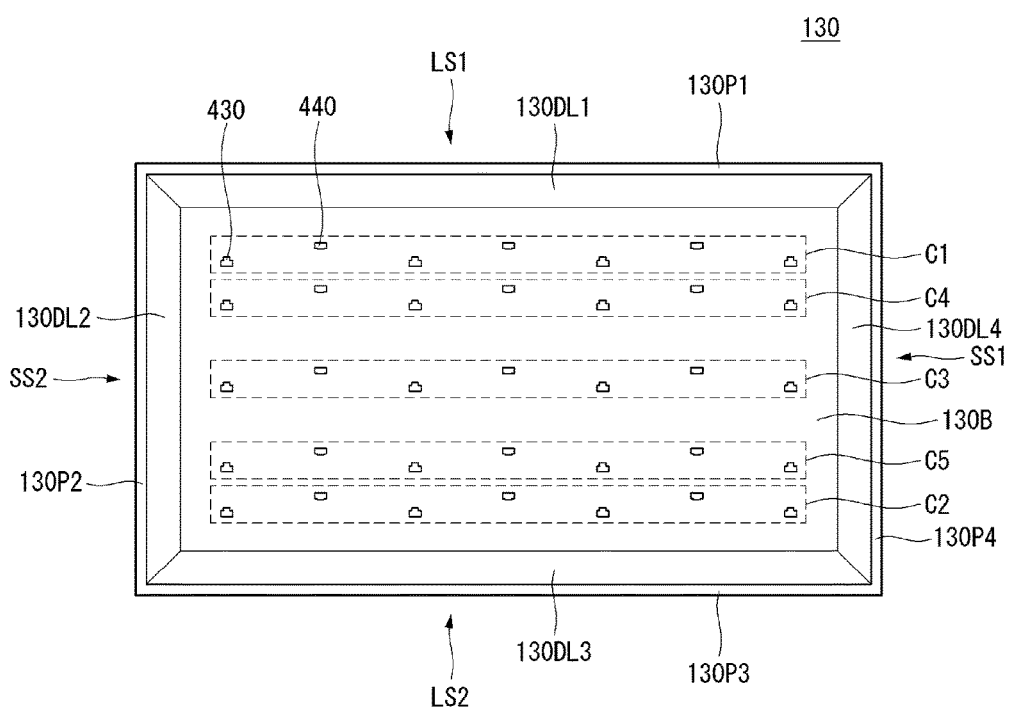
FIGS. 30, 31, 32, 33, 34, 35, 36, 37 and 38 illustrate examples of the coupling and the arrangement of light sources according to one embodiment.
Figure 31:
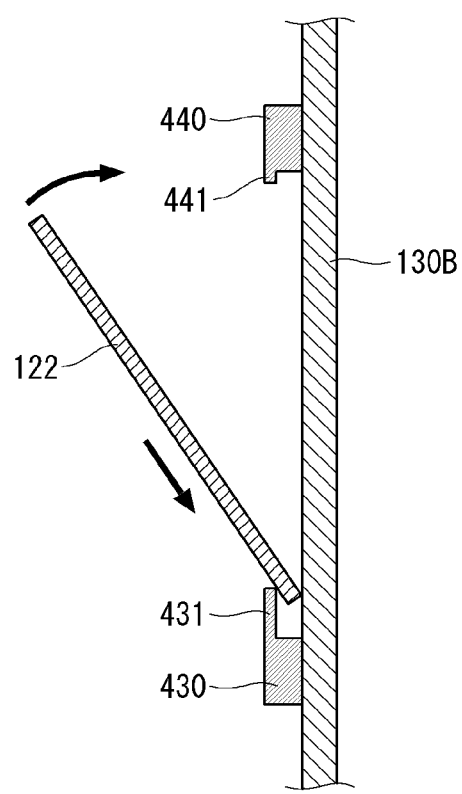

Referring to FIGS. 30 and 31, a first holder 430 may be positioned on the frame 130. The first holder 430 may be positioned on the flat portion 130B. The first holder 430 may be formed on the flat portion 130B. The first holder 430 may be positioned adjacent to the first inclined portion 130DL1. The first holder 430 may include a plurality of first holders 430. For example, the first holder 430 may form a row of first holders 430 in the left-right direction along the first long side LS1 of the frame 130 on the flat portion 130B of the frame 130.

The first holder 430 may have a protrusion 431. The first holder 430 may be fixed to the flat portion 130B. The protrusion 431 may protrude from the first holder 430 to the outside. One side of the substrate 122 may be placed on the first holder 430. The one side of the substrate 122 may be inserted into the first holder 430. The one side of the substrate 122 may be supported by the first holder 430 and the protrusion 431.

A second holder 440 may be positioned on the frame 130. The second holder 440 may be positioned on the flat portion 130B. The second holder 440 may be formed on the flat portion 130B. The second holder 440 may be positioned between the first inclined portion 130DL1 and the first holder 430. The second holder 440 may include a plurality of second holders 440. For example, the second holder 440 may form a row of second holders 440 in the left-right direction along the first long side LS1 of the frame 130 on the flat portion 130B of the frame 130.

The second holder 440 may have a protrusion 441. The protrusion 441 of the second holder 440 may be directed toward the protrusion 431 of the first holder 430. Namely, when the protrusion 431 of the first holder 430 is directed toward the upper side of the frame 130, the protrusion 441 of the second holder 440 may be directed toward the lower side of the frame 130. Hence, the substrate 122 may be fixed to the frame 130 by the first holder 430 and the second holder 440.

In this instance, the first holder 430 and the second holder 440 may be alternately disposed. The first holder 430 and the second holder 440 may form a row C forming a pair.

A plurality of first and second holders 430 and 440 of a first row C1 may be formed on the flat portion 130B adjacent to the first inclined portion 130DL1.

A plurality of first and second holders 430 and 440 of a second row C2 may be formed on the flat portion 130B adjacent to the third inclined portion 130DL3.

A plurality of first and second holders 430 and 440 of a third row C3 may be positioned between the plurality of first and second holders 430 and 440 of the first row C1 and the plurality of first and second holders 430 and 440 of the second row C2.

A plurality of first and second holders 430 and 440 of a fourth row C4 may be positioned between the plurality of first and second holders 430 and 440 of the first row C1 and the plurality of first and second holders 430 and 440 of the third row C3. Further, the plurality of first and second holders 430 and 440 of the fourth row C4 may be positioned adjacent to the plurality of first and second holders 430 and 440 of the first row C1.

A plurality of first and second holders 430 and 440 of a fifth row C5 may be positioned between the plurality of first and second holders 430 and 440 of the second row C2 and the plurality of first and second holders 430 and 440 of the third row C3. The plurality of first and second holders 430 and 440 of the fifth row C5 may be positioned adjacent to the plurality of first and second holders 430 and 440 of the second row C2.

Figure 32:
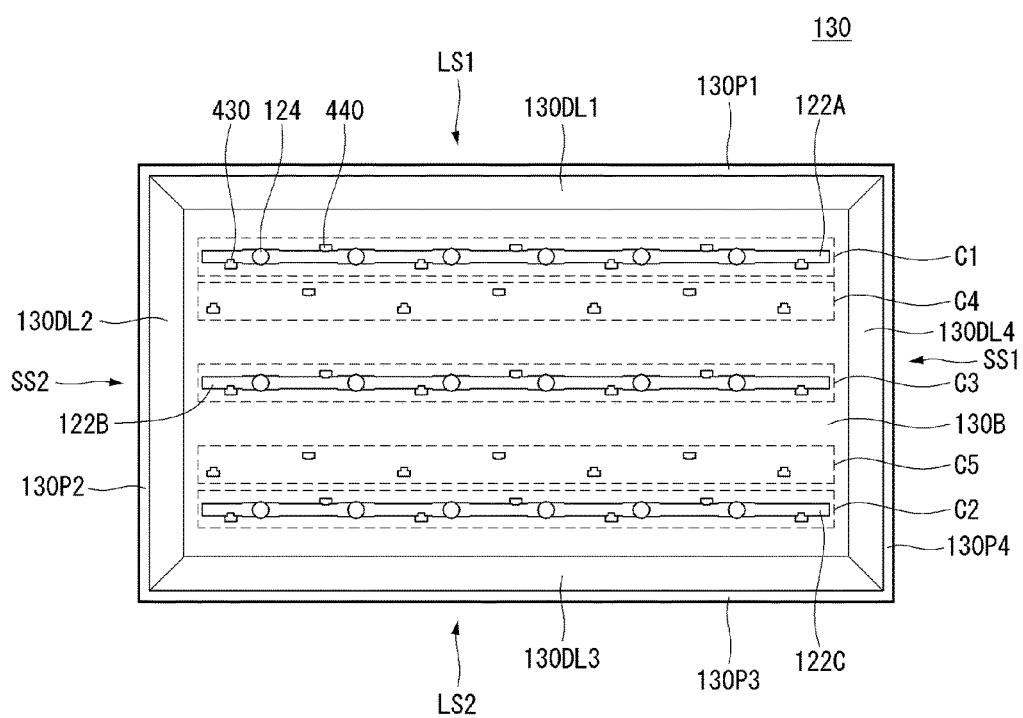

Referring to FIG. 32, a first substrate 122A may be mounted on a plurality of first and second holders 430 and 440 of a first row C1. A second substrate 122B may be mounted on a plurality of first and second holders 430 and 440 of a third row C3. A third substrate 122C may be mounted on a plurality of first and second holders 430 and 440 of a second row C2. Namely, the substrates 122A, 122B and 122C and the light assemblies 124 may be arranged in three rows.

Figure 33:
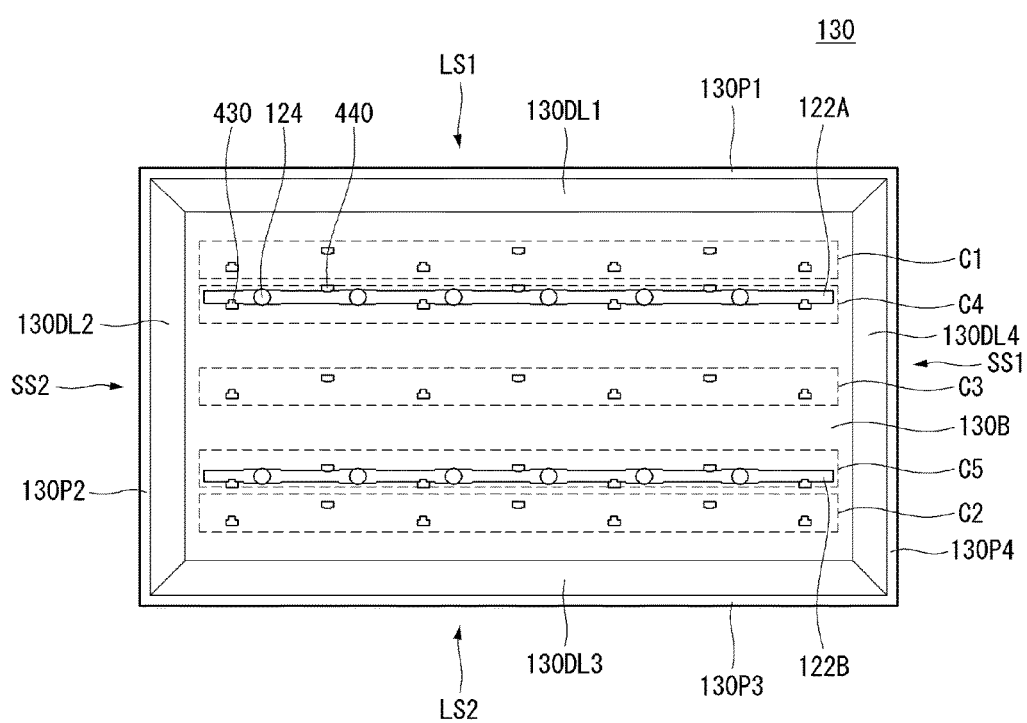

Referring to FIG. 33, a first substrate 122A may be mounted on a plurality of first and second holders 430 and 440 of a fourth row C4, and a second substrate 122B may be mounted on a plurality of first and second holders 430 and 440 of a fifth row C5. Namely, the substrates 122A and 122B and the light assemblies 124 may be arranged in two rows.

Figure 34:
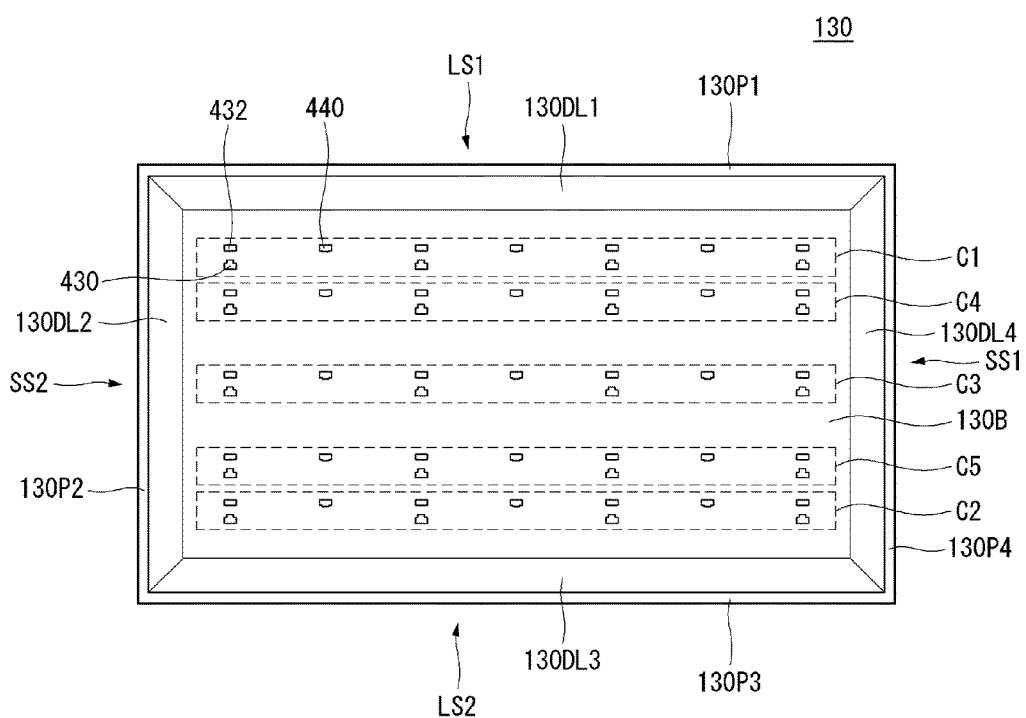
Figure 35:
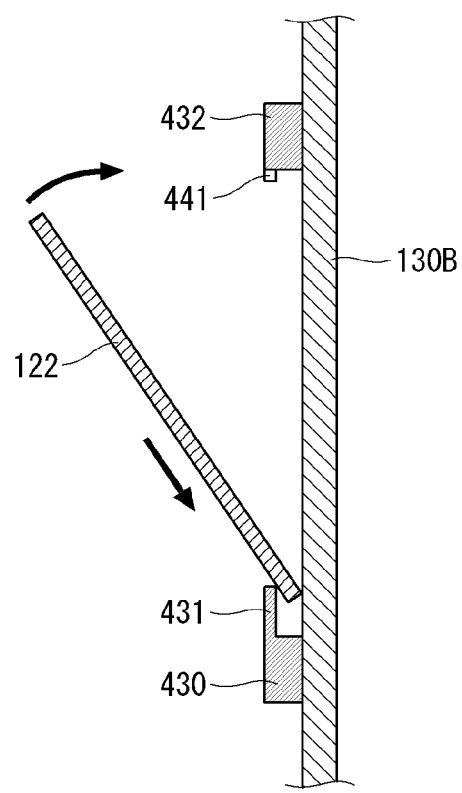

Referring to FIGS. 34 and 35, a supporter 432 may face a first holder 430. The supporter 432 may be positioned above the first holder 430 based on the up-down direction of the frame 130. The supporter 432 may be positioned on the left side or the right side of a second holder 440 based on the left-right direction of the frame 130. The supporters 432 may be positioned on both sides of the second holder 440. Hence, when the substrate 122 is inserted into the first holder 430, the supporter 432 may support the substrate 122. Further, the supporter 432 may prevent the substrate 122 from being detached from the first holder 430 after the substrate 122 is inserted into the first holder 430.

In this instance, the first holder 430 and the second holder 440 may be alternately disposed. The first holder 430 and the second holder 440 may form a row C forming a pair.

A plurality of first and second holders 430 and 440 of a first row C1 may be formed on the flat portion 130B adjacent to the first inclined portion 130DL1.

A plurality of first and second holders 430 and 440 of a second row C2 may be formed on the flat portion 130B adjacent to the third inclined portion 130DL3.

A plurality of first and second holders 430 and 440 of a third row C3 may be positioned between the plurality of first and second holders 430 and 440 of the first row C1 and the plurality of first and second holders 430 and 440 of the second row C2.

A plurality of first and second holders 430 and 440 of a fourth row C4 may be positioned between the plurality of first and second holders 430 and 440 of the first row C1 and the plurality of first and second holders 430 and 440 of the third row C3. Further, the plurality of first and second holders 430 and 440 of the fourth row C4 may be positioned adjacent to the plurality of first and second holders 430 and 440 of the first row C1.

A plurality of first and second holders 430 and 440 of a fifth row C5 may be positioned between the plurality of first and second holders 430 and 440 of the second row C2 and the plurality of first and second holders 430 and 440 of the third row C3. The plurality of first and second holders 430 and 440 of the fifth row C5 may be positioned adjacent to the plurality of first and second holders 430 and 440 of the second row C2.

Figure 36:
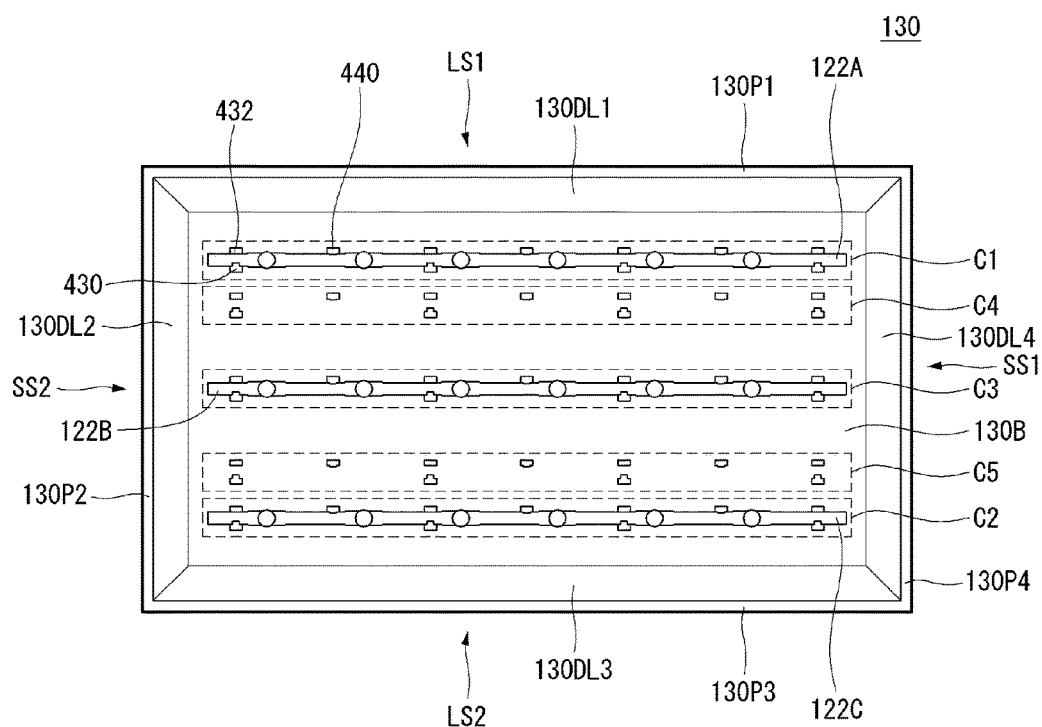
Figure 37:
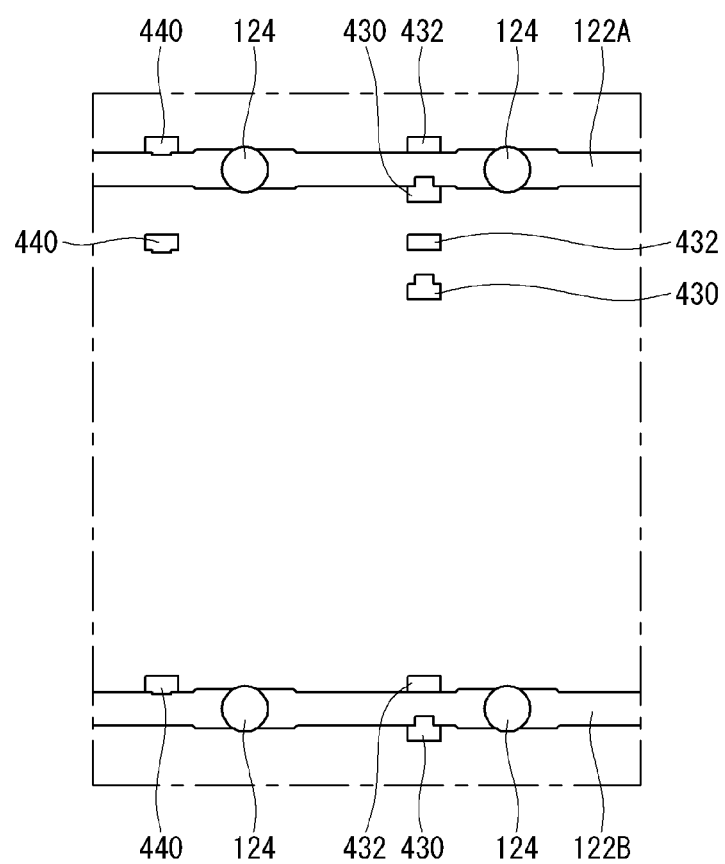

Referring to FIGS. 36 and 37, a first substrate 122A may be mounted on a plurality of first and second holders 430 and 440 of a first row C1. A second substrate 122B may be mounted on a plurality of first and second holders 430 and 440 of a third row C3. A third substrate 122C may be mounted on a plurality of first and second holders 430 and 440 of a second row C2. Namely, the substrates 122A, 122B and 122C and the light assemblies 124 may be arranged in three rows.

Figure 38:
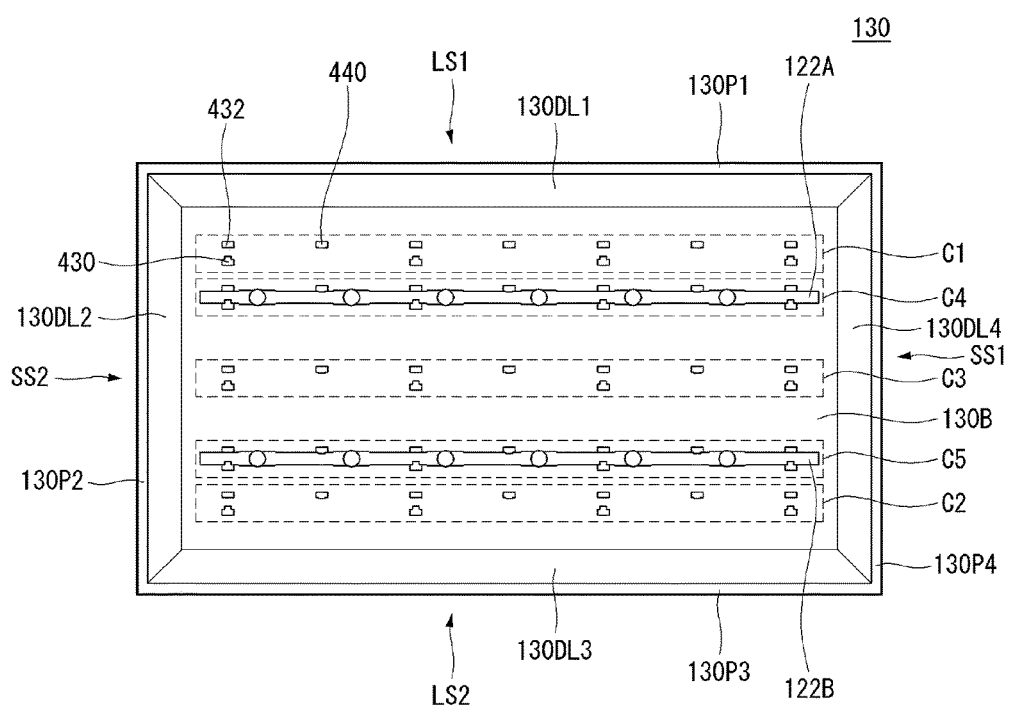

Referring to FIG. 38, a first substrate 122A may be mounted on a plurality of first and second holders 430 and 440 of a fourth row C4, and a second substrate 122B may be mounted on a plurality of first and second holders 430 and 440 of a fifth row C5. Namely, the substrates 122A and 122B and the light assemblies 124 may be arranged in two rows.

The substrates 122A, 122B and 122C may be fixed to the frame 130 using an adhesive member, for example, a double-sided tape.

FIGS. 39 to 46 illustrate examples of an edge of a frame according to one embodiment.

Figure 39:
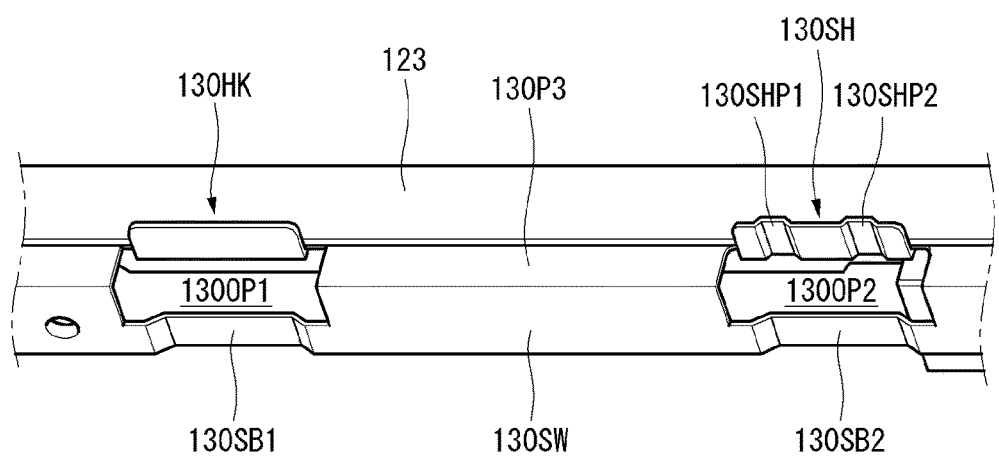
FIGS. 39, 40, 41, 42, 43, 44, 45, 46A and 46B illustrate examples of an edge of a frame according to one embodiment.

Referring to FIG. 39, a support portion 130SH may be positioned on the flange 130P of the frame 130. The support portion 130SH may be formed on a portion of the flange 130P of the frame 130. The support portion 130SH may be formed by bending a portion of the flange 130P of the frame 130.

The support portion 130SH may be formed by partially bending the flange 130P and the sidewall 130SW of the frame 130. The flange 130P and the side wall 130SW of the frame 130 may be cut and bent to form the support portion 130SH. Hence, an empty space 1300P2 may be formed between the support portion 130SH and the sidewall 130SW.

When an overall thickness of the frame 130 decreases, a thickness of the support portion 130SH included in the frame 130 may also decrease. This may lead to a reduction in rigidity of the support portion 130SH.

The support portion 130SH may be spaced apart from an edge formed by the flange 130P and the sidewall 130SW by a predetermined distance and positioned inside the flange 130P. The support portion 130SH may be positioned adjacent to the optical layer 123.

The support portion 130SH may be entirely bent. The support portion 130SH may include protrusions 130SHP1 and 130SHP2. The protrusions 130SHP1 and 130SHP2 may protrude from the sidewall 130SW toward the optical layer 123. The protrusions 130SHP1 and 130SHP2 may be formed by pressing the support portion 130SH. A plurality of protrusions 130SHP1 and 130SHP2 may be formed. The first protrusion 130SHP1 may protrude to the inside of the frame 130, and the second protrusion 130SHP2 may also protrude to the inside of the frame 130. The first protrusion 130SHP1 and the second protrusion 130SHP2 may protrude at the same protrusion level. Namely, the first protrusion 130SHP1 and the second protrusion 130SHP2 may simultaneously support the side of the optical layer 123.

The support portion 130SH can secure sufficient rigidity for supporting the optical layer 123 due to the overall shape of the support portion 130SH.

A hook portion 130HK may be positioned on the flange 130P of the frame 130. The hook portion 130HK may be formed on a portion of the flange 130P of the frame 130. The hook portion 130HK may be formed by bending a portion of the flange 130P of the frame 130.

The hook portion 130HK may be formed by partially bending the flange 130P and the sidewall 130SW of the frame 130. The flange 130P and the side wall 130SW of the frame 130 may be cut and bent to form the hook portion 130HK. Hence, an empty space 1300P1 may be formed between the hook portion 130HK and the sidewall 130SW.

The hook portion 130HK may be spaced apart from an edge formed by the flange 130P and the sidewall 130SW by a predetermined distance and positioned inside the flange 130P. The hook portion 130HK may be positioned adjacent to the optical layer 123.

The sidewall 130SW positioned below the support portion 130SH or the hook portion 130HK may be bent or may form a stepped portion. Hence, the support portion 130SH or the hook portion 130HK may provide a clearance while maintaining the rigidity of the sidewall 130SW.

Figure 40:
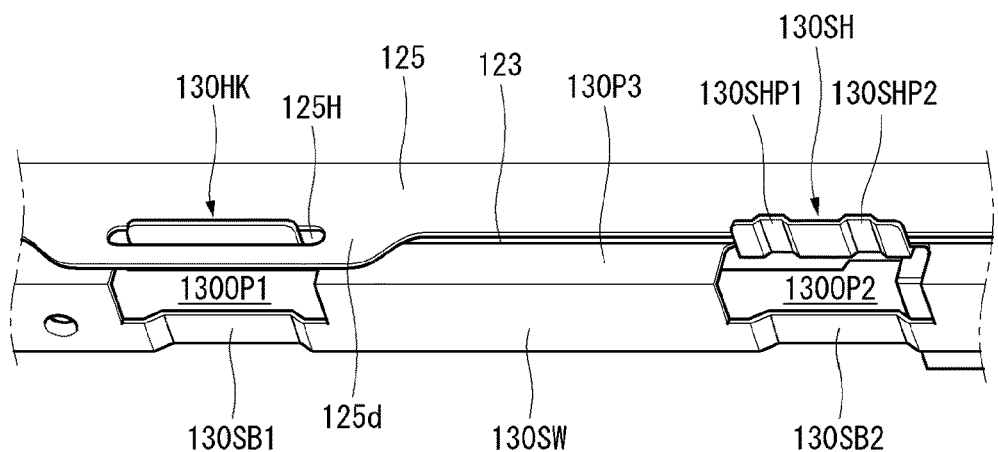
Figure 41:
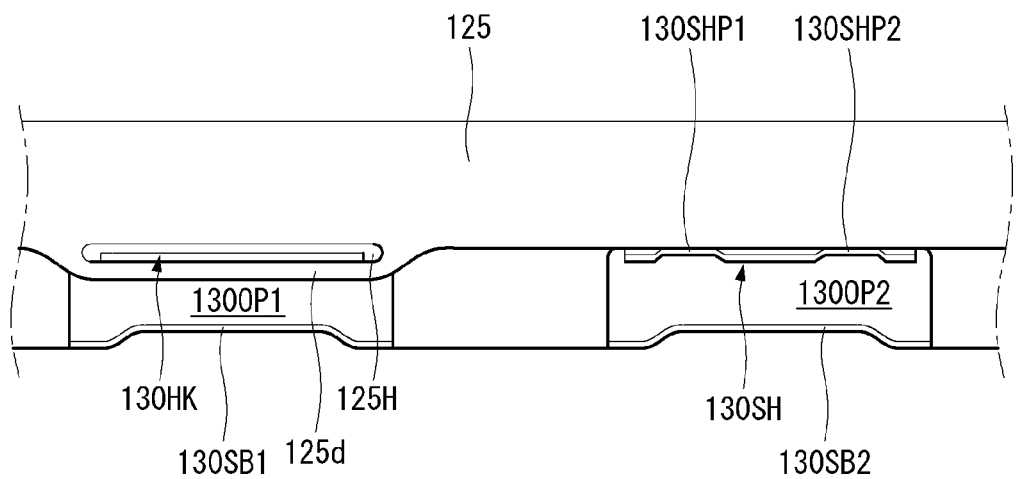

Referring to FIGS. 40 and 41, the support portion 130SH may support the optical layer 123. The support portion 130SH may support the side of the optical layer 123. The optical layer 123 may be, for example, a diffusion plate. The protrusions 130SHP1 and 130SHP2 of the support portion 130SH may contact the side of the optical layer 123. Further, the support portion 130SH may support the optical sheet 125, and the support portion 130SH may support the side of the optical sheet 125. In this instance, the protrusions 130SHP1 and 130SHP2 of the support part 130SH may contact the side of the optical sheet 125. The optical sheet 125 may be placed on the optical layer 123. In this instance, the coupling portion 125d of the optical sheet 125 may be inserted into the hook portion 130HK.

Figure 42:
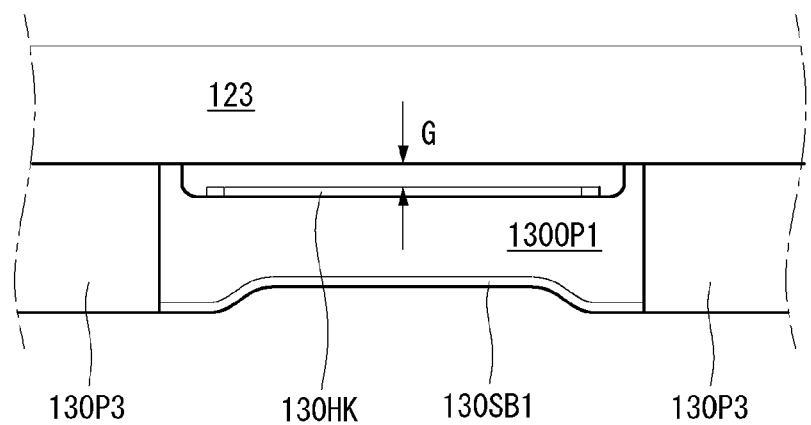
Figure 43:
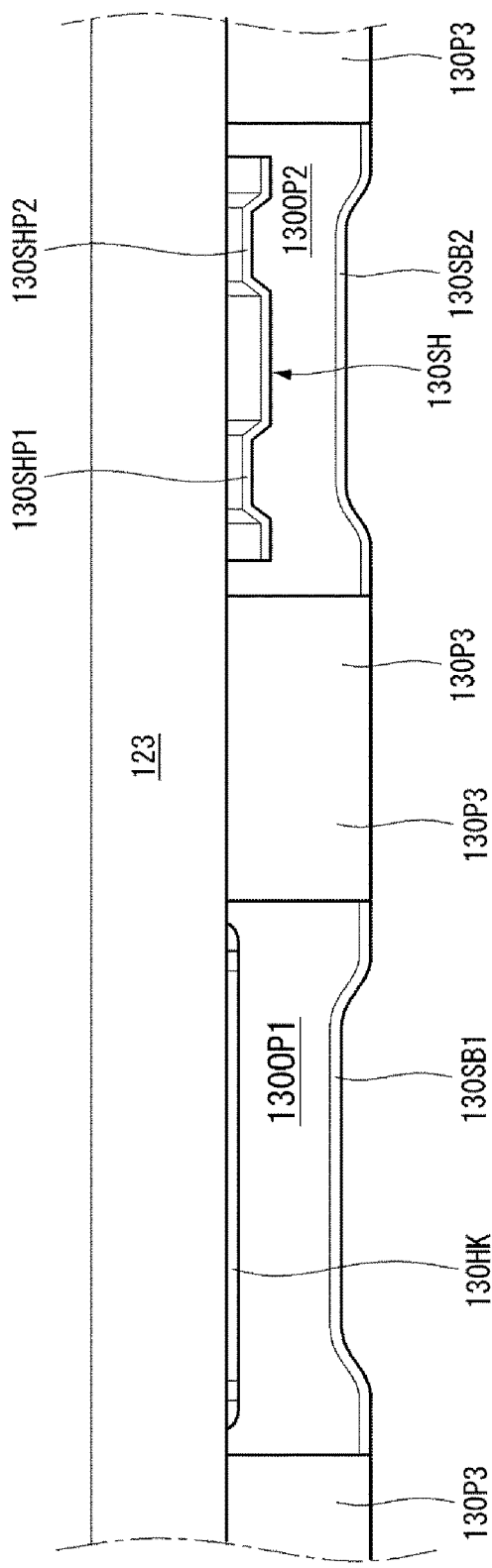

Referring to FIGS. 42 and 43, the hook portion 130HK may be spaced apart from the optical layer 123. A gap G may be formed between the hook portion 130HK and the optical layer 123. The gap G may be, for example, about 0.5 millimeters. The hook portion 130HK may fix the optical sheet 125 while maintaining the gap G from the optical layer 123.

The optical layer 123 may be supported by the support portion 130SH. When the support portion 130SH supporting the optical layer 123 is collapsed due to an excessive load or an external force or an impact that may occur in the movement, the hook portion 130HK may be a secondary supporting means for supporting the optical layer 123.

Figure 44:
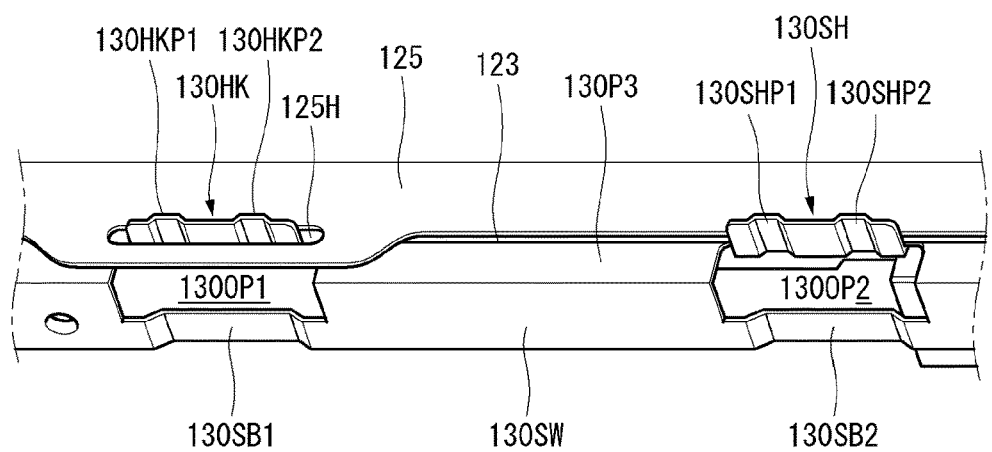
Figure 45:
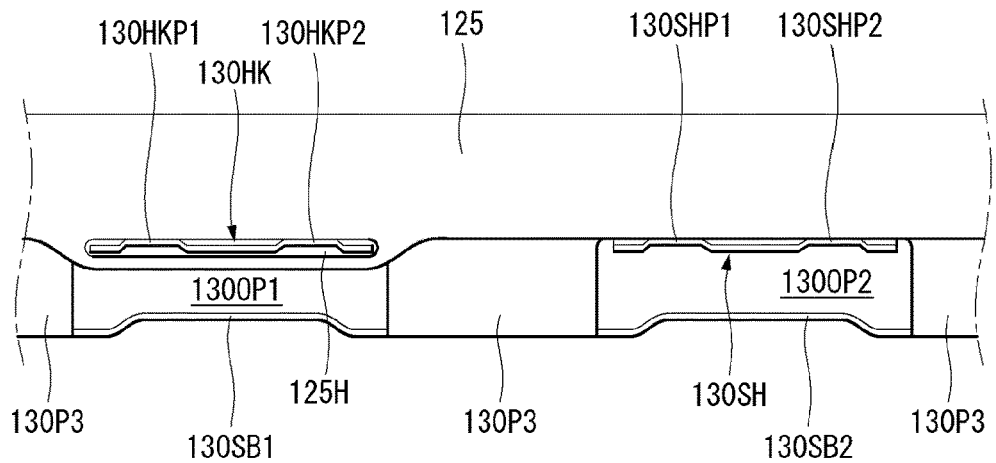

Referring to FIGS. 44 and 45, the hook portion 130HK may be entirely bent. The hook portion 130HK may include protrusions 130HKP1 and 130HKP2. The hook portion 130HK may protrude from the sidewall 130SW toward the optical layer 123. The protrusions 130HKP1 and 130HKP2 may be formed by pressing the hook portion 130HK. A plurality of protrusions 130HKP1 and 130HKP2 may be formed. The first protrusion 130HKP1 may protrude to the inside of the frame 130, and the second protrusion 130HKP2 may also protrude to the inside of the frame 130. The first protrusion 130 HKP1 and the second protrusion 130HKP2 may protrude at the same protrusion level. Namely, the first protrusion 130 HKP1 and the second protrusion 130HKP2 may simultaneously support the side of the optical layer 123.

The hook portion 130HK can secure sufficient rigidity for supporting the optical layer 123 due to the overall shape of the hook portion 130HK. Further, even when an external force or an impact is applied to the optical layer 123 supported by the hook portion 130HK and the support portion 130SH, a fixed state of the optical layer 123 may be maintained. Namely, the durability of the display device 100 can be further improved.

Figure 46A:
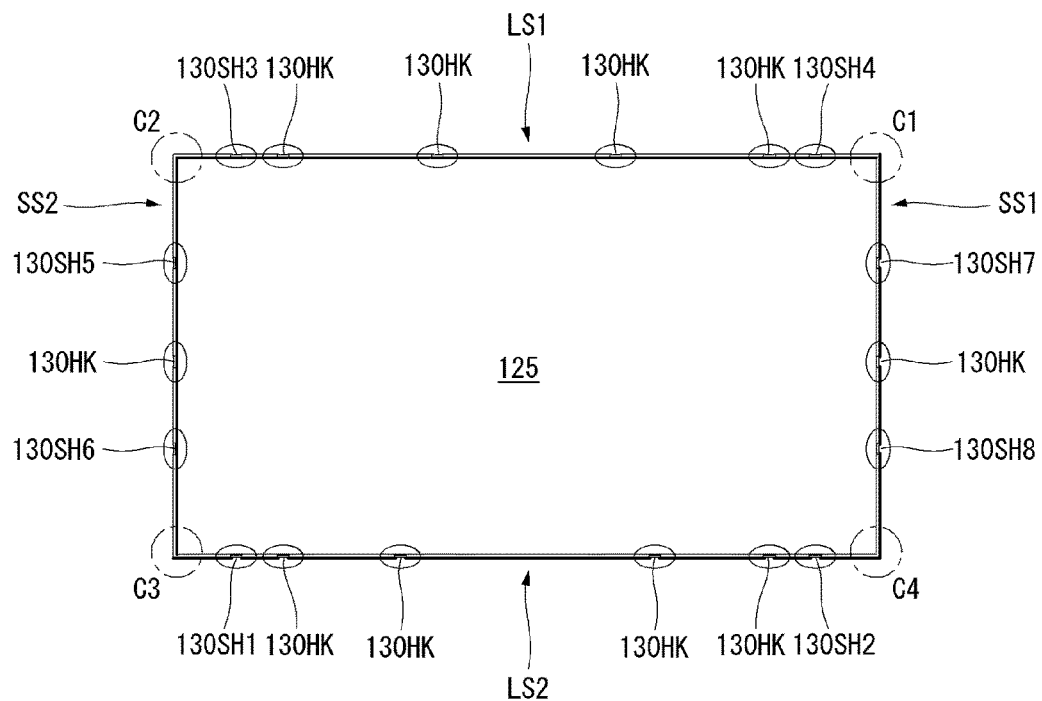

Referring to FIG. 46A, the support portion 130SH may be formed at a location adjacent to a corner C. For example, a first support portion 130SH1 may be positioned on the second long side LS2 and may be adjacent to a third corner C3. A second support portion 130SH2 may be positioned on the second long side LS2 and may be adjacent to a fourth corner C4. A third support portion 130SH3 may be positioned on the first long side LS1 and may be adjacent to a second corner C2. A fourth support portion 130SH4 may be positioned on the first long side LS1 and may be adjacent to a first corner C1.

A fifth support portion 130SH5 may be positioned on the second short side SS2 and may be adjacent to the second corner C2. A sixth support portion 130SH6 may be positioned on the second short side SS2 and may be adjacent to the third corner C3. A seventh support portion 130SH7 may be positioned on the first short side SS1 and may be adjacent to the first corner C1. An eighth support portion 130SH8 may be positioned on the first short side SS1 and may be adjacent to the fourth corner C4. In this instance, the fifth to eighth support portions 130SH5 to 130SH8 may be omitted.

Figure 46B:
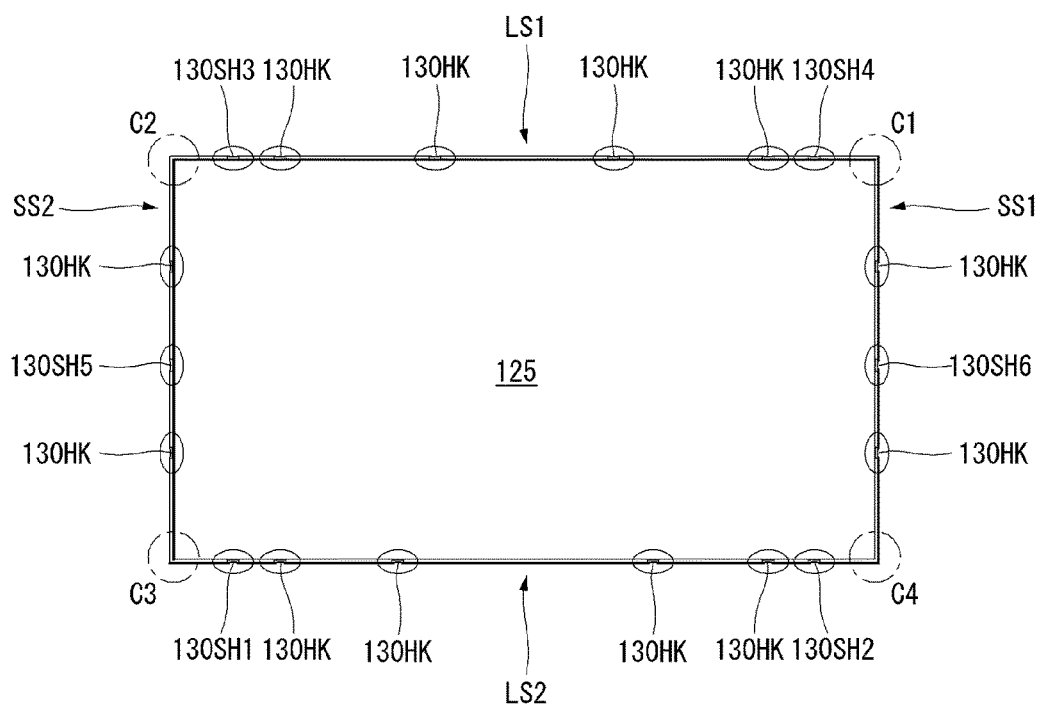

Referring to FIG. 46B, the support portion 130SH may be formed at a location adjacent to a corner C. For example, a first support portion 130SH1 may be positioned on the second long side LS2 and may be adjacent to a third corner C3. A second support portion 130SH2 may be positioned on the second long side LS2 and may be adjacent to a fourth corner C4. A third support portion 130SH3 may be positioned on the first long side LS1 and may be adjacent to a second corner C2. A fourth support portion 130SH4 may be positioned on the first long side LS1 and may be adjacent to a first corner C1.

A fifth support portion 130SH5 may be positioned in the center of the second short side SS2. A sixth support portion 130SH6 may be positioned in the center of the first short side SS1. In this instance, the fifth support portion 130SH5 and/or the sixth support portion 130SH6 may be omitted.

A number or a position of hook portions 130HK described above may be changed.

Figure 47:
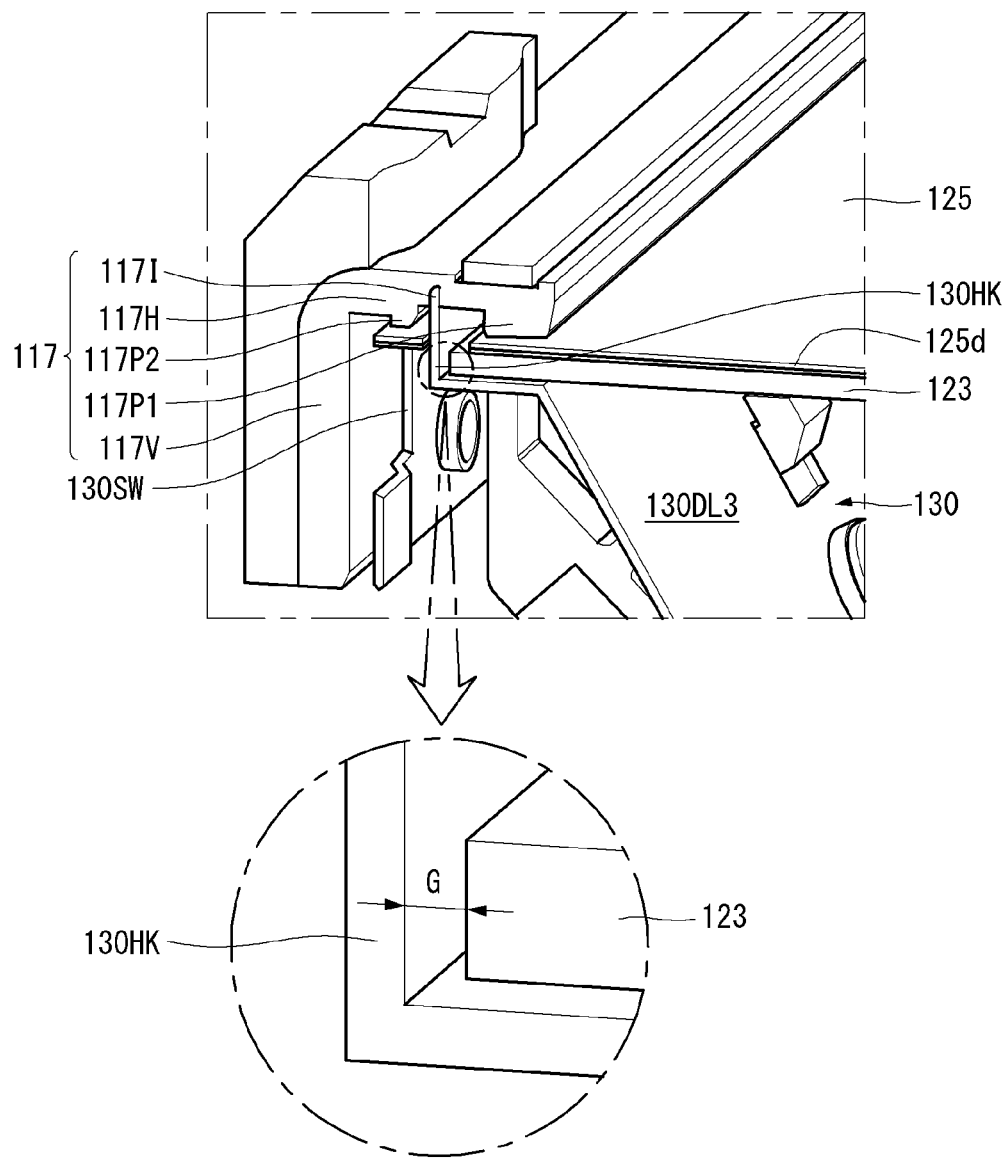
FIG. 47 illustrates an example of a cross section of a display device according to one embodiment.
Figure 48:
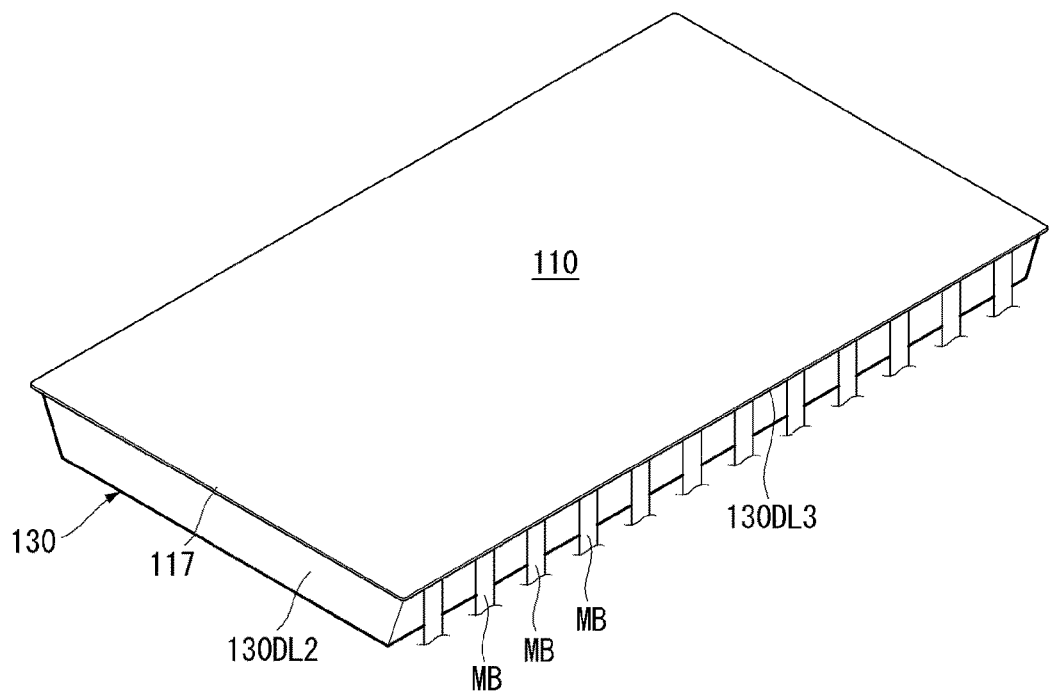
FIG. 48 illustrates an example of a display device according to one embodiment.

FIGS. 47 and 48 illustrate examples of a display device according to one embodiment.

Referring to FIG. 47, the optical layer 123 may be positioned in front of the frame 130. The optical layer 123 may be placed on the flange 130P3 of the frame 130. In this instance, the optical layer 123 may be spaced apart from the hook portion 130HK. A gap G may be formed between the optical layer 123 and the hook portion 130HK.

The optical sheet 125 may be positioned in front of the optical layer 123. The optical sheet 125 may be placed on the front surface of the optical layer 123. The back surface of the optical sheet 125 may contact the front surface of the optical layer 123. In this instance, the coupling portion 125d of the optical sheet 125 may be inserted into the hook portion 130HK, and thus a position of the optical sheet 125 may be fixed.

The guide panel 117 may be positioned adjacent to the side and/or the front surface of the frame 130. The guide panel 117 may include a horizontal portion 117H and a vertical portion 117V. The horizontal portion 117H may be positioned in front of the flange 130P3 of the frame 130. The horizontal portion 117H may be positioned on the front surface of the optical layer 123 and/or the optical sheet 125.

The horizontal portion 117H may include pressing portions 117P. A first pressing portion 117P1 may press a portion of the front surface or a portion of the periphery of the front surface of the optical layer 123 and/or the optical sheet 125. A second pressing portion 117P2 may press the coupling portion 125d of the optical sheet 125. Hence, the optical layer 123 and/or the optical sheet 125 may be firmly coupled to the frame 130. The horizontal portion 117H may have a groove 117I. The support portion 130SH or the hook portion 130HK may be inserted into the groove 117I. Thus, the guide panel 117 may be coupled to the frame 130. The vertical portion 117V may be positioned adjacent to the sidewall 130SW of the frame 130. The vertical portion 117V may face the sidewall 130SW of the frame 130. The vertical portion 117V may be extended from the horizontal portion 117H. An adhesive member AD may be fixed to a portion of a front surface of the horizontal portion 117H. The adhesive member AD may be, for example, a double-sided tape.

Referring to FIGS. 47 and 48, the display panel 110 may be placed on the front surface of the horizontal portion 117H of the guide panel 117. The display panel 110 may be fixed to the guide panel 117 by the adhesive member AD. A member layer MB on one side of the display panel 110 may be extended toward the rear or the back surface of the frame 130 while winding the side of the frame 130 or the horizontal portion 117H and/or the vertical portion 117V of the guide panel 117. For example, the member layer MB may be a chip-on-film (COF) or a flexible printed circuit board (FPCB).

Figure 49:
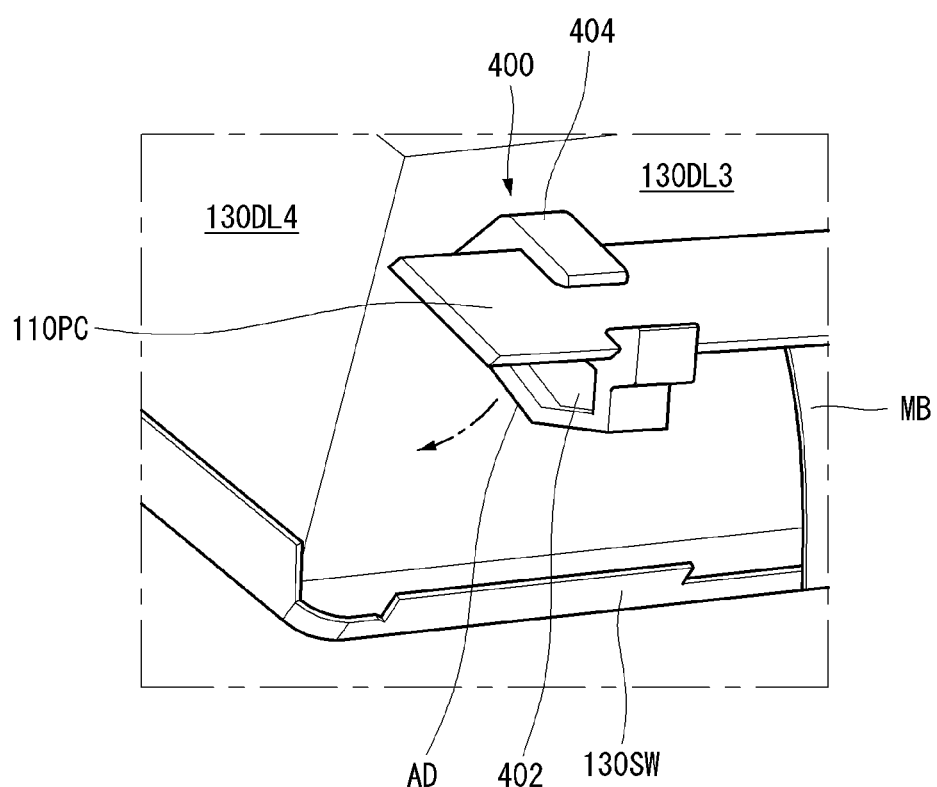
FIGS. 49 and 50 illustrate examples of fixing a member layer of a display device according to one embodiment.
Figure 50:
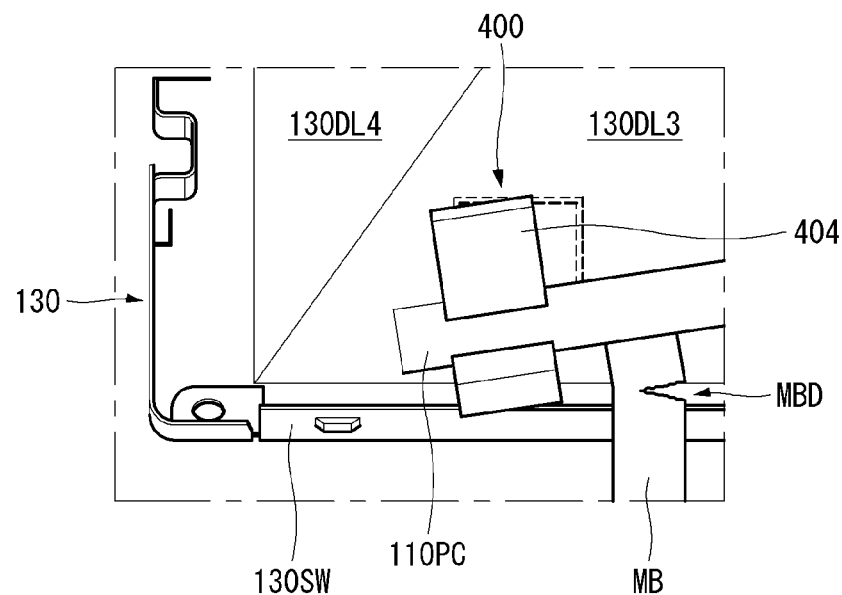

FIGS. 49 and 50 illustrate examples of fixing a member layer of a display device according to one embodiment.

Referring to FIG. 49, a holder 400 may be positioned in the rear of the frame 130. The holder 400 may be positioned on the back surface of the frame 130. The holder 400 may be positioned on a back surface of the inclined portion 130DL3 of the frame 130. When an overall thickness of the frame 130 is thin, the holder 400 may be positioned on the back surface of the frame 130. Further, when the overall thickness of the frame 130 is thick, the holder 400 may be positioned on the side of the frame 130 or the back surface of the inclined portion 130DL3. The thickness of the frame 130 may mean the size of the inclined portion 130DL3 (130DL).

The holder 400 may be fixed to the back surface of the inclined portion 130DL3 of the frame 130 by an adhesive member (not shown). The holder 400 may include a body 402, a clip 404, and an adhesive portion AD. The holder 400 may be fixed by attaching the adhesive portion AD to the back surface of the inclined portion 130DL3 of the frame 130. The adhesive portion AD may be, for example, a double-sided tape. A substrate 110PC may be, for example, an S-PCB and may be inserted into the holder 400.

Referring to FIG. 50, a fixed position of the holder 400 may be distorted by an external force or an impact. When a position of the holder 400 is changed, a fixed position of the substrate 110PC may be also changed. In this instance, the member layer MB having a limited length may be damaged.

FIGS. 51 to 54 illustrate examples of fixing a member layer of a display device according to one embodiment.

Figure 51:
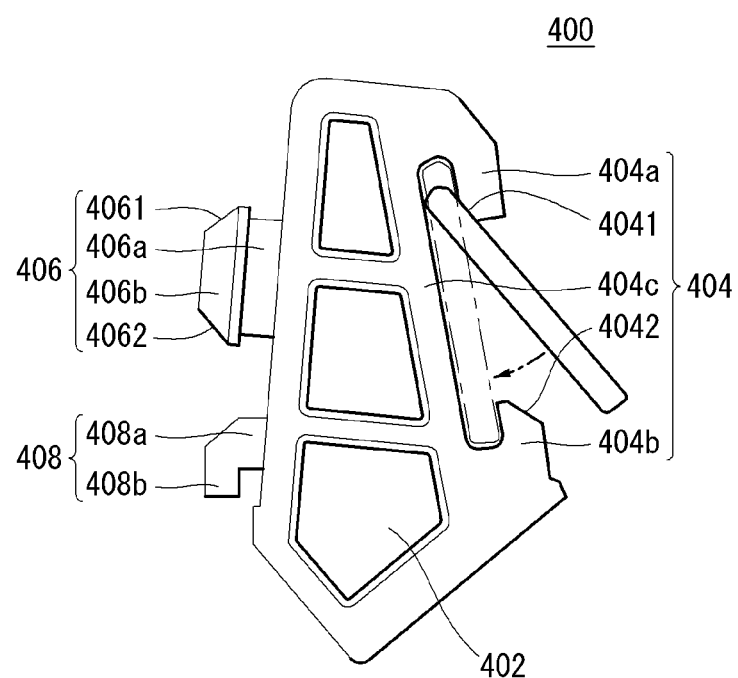
FIGS. 51, 52, 53 and 54 illustrate examples of fixing a member layer of a display device according to one embodiment.

Referring to FIG. 51, the holder 400 may include a body 402, a clip 404, a first hook 406, and a second hook 408. The clip 404 may be a material with elasticity, for example, a synthetic resin.

The clip 404 may include a palm 404c, a first finger 404a, and a second finger 404b. The palm 404c may be equal to or slightly larger than a width of the substrate 110PC. Namely, the palm 404c may provide some clearance when the substrate 110PC is placed on the palm 404c. The first finger 404a may bend toward the second finger 404b. The second finger 404b may bend toward the first finger 404a. The first finger 404a may include an inclined portion 4041. The inclined portion 4041 of the first finger 404a may provide a path into which the substrate 110PC is inserted. The second finger 404b may include an inclined portion 4042. The inclined portion 4042 of the second finger 404b may provide a path through which the substrate 101PC is inserted into the second finger 404b in a state where the substrate 101PC is inserted into the first finger 404a.

In other words, the first finger 404a and the second finger 404b may be extended from both ends of the palm 404c. In this instance, the first finger 404a and the second finger 404b may bend so that they face each other. The first inclined portion 4041 may be formed at the first finger 404a, and the second inclined portion 4042 may be formed at the second finger 404b. The first inclined portion 4041 may be formed on a surface of the first finger 404a facing the palm 404c. The second inclined portion 4042 may be formed on a surface of the second finger 404b which does not face the palm 404c and faces the outside.

The first hook 406 may be positioned opposite the clip 404 with the body 402 interposed therebetween. For example, the first hook 406 may be entirely formed in a shape of an arrowhead or a wedge. The first hook 406 may include a column 406a and a head 406b.

The column 406a may protrude from one side or one surface of the body 402. The head 406b may be formed on the column 406a. The head 406b may be formed on the top of the column 406a. A diameter of the head 406b may be greater than a diameter of the column 406a.

Inclined portions 4061 and 4062 may be formed at the periphery or an edge of the head 406b. Namely, the head 406b may include a first inclined portion 4061 and a second inclined portion 4062. The first inclined portion 4061 may be positioned opposite the second inclined portion 4062. In a three-dimensional viewpoint, the first inclined portion 4061 may be connected to the second inclined portion 4062. Namely, the first inclined portion 4061 and the second inclined portion 4062 may be formed as a single surface.

The second hook 408 may include a vertical portion 408a and a hook portion 408b. The vertical portion 408a may protrude from the body 402. The hook portion 408b may bend in a different direction from a protruding direction of the vertical portion 408a and may be extended from the vertical portion 408a. For example, the second hook 408 may entirely have a hook shape.

Figure 52:
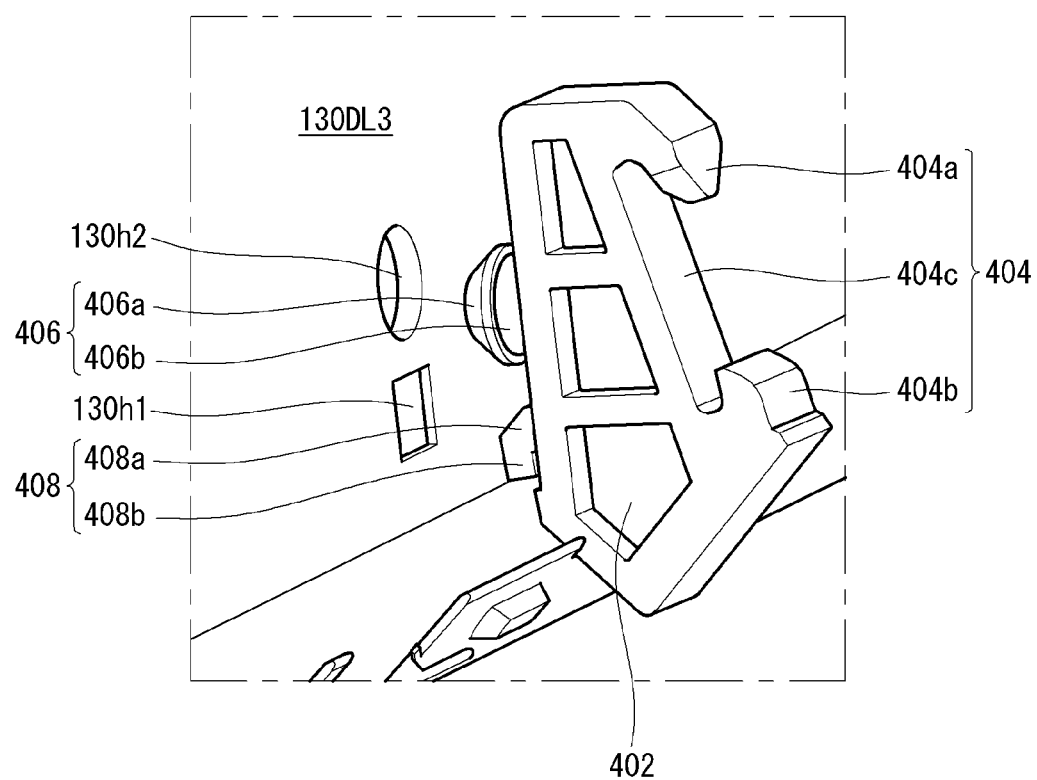
Figure 53:
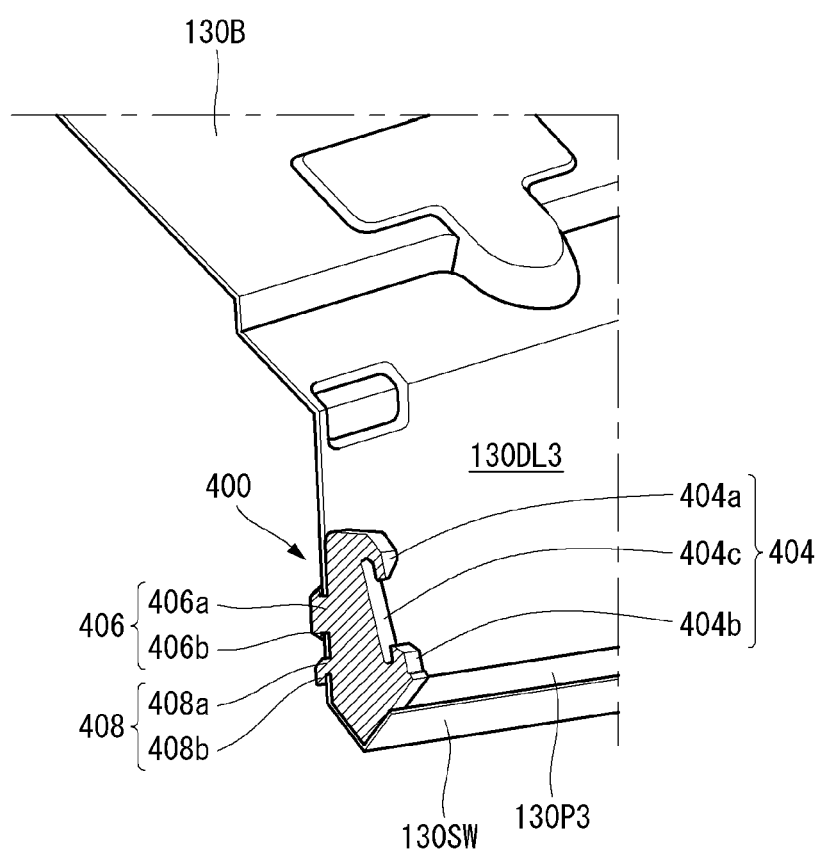
Figure 54:
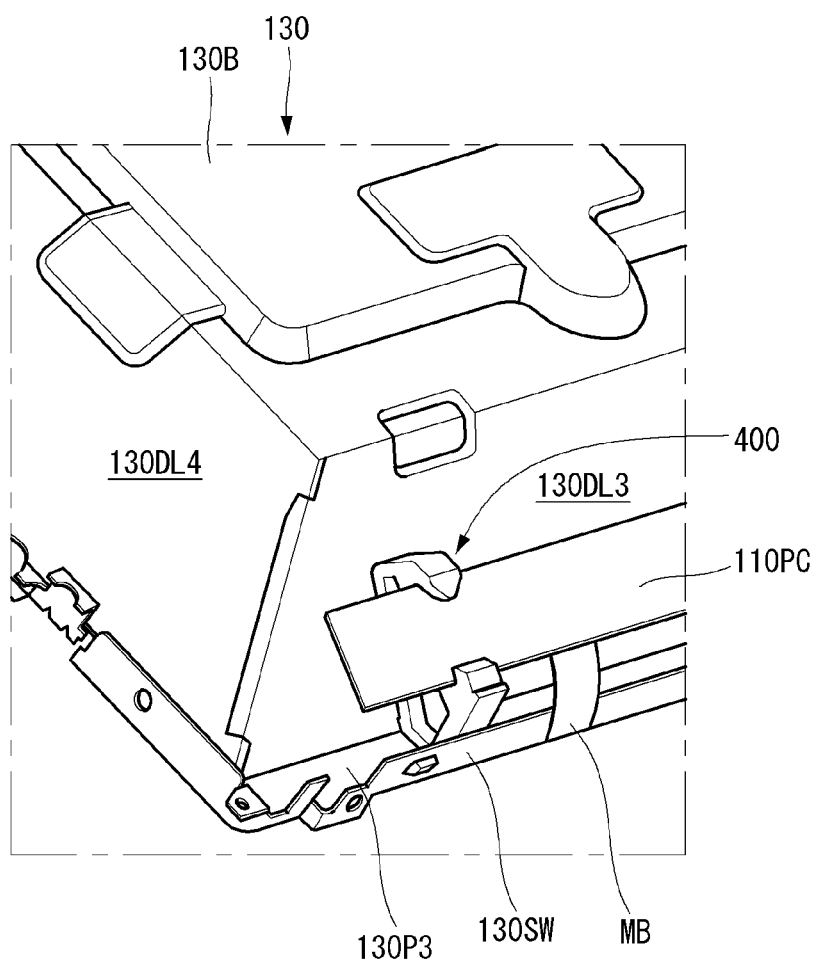

Referring to FIGS. 52 to 54, the frame 130 may have a fixing hole 130h. The fixing hole 130h may be formed in the back surface of the frame 130. The fixing hole 130h may be formed in the inclined portion 130DL3 of the frame 130. A plurality of fixing holes 130h may be formed in the inclined portion 130DL3 of the frame 130.

A first fixing hole 130h2 may be formed to pass through the inclined portion 130DL3. The first fixing hole 130h2 may be formed in a circular shape so that the first hook 406 can be inserted into the first fixing hole 130h2. A second fixing hole 130h1 may be formed adjacent to the first fixing hole 130h2. The second fixing hole 130h1 may be formed to pass through the inclined portion 130DL3. The second fixing hole 130h1 may be formed in a rectangular shape so that the second hook 408 can be inserted into the second fixing hole 130h1. The second fixing hole 130h1 may have a different shape from the first fixing hole 130h2. In this instance, the second fixing hole 130h1 may be formed larger than the second hook 408.

In the holder 400, the second hook 408 may be inserted into the second fixing hole 130h1, and then the first hook 406 may be inserted into the first fixing hole 130h2. Hence, the holder 400 fixed to the back surface of the frame 130 can be prevented from being distorted from its position or can be prevented from being detached from the frame 130.

When the substrate 110PC is inserted into the holder 400, the substrate 110PC cannot move by an external force or an impact owing to a stable fixing of the holder 400. Further, a damage of the member layer MB can be prevented.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame disposed at a rear of the display panel;
   at least one substrate disposed between the display panel and the frame; and
   a plurality of light assemblies mounted on the at least one substrate and configured to provide the display panel with light; and
   wherein the frame comprises:
   at least one flat portion forming a flat surface;
   at least one trench forming a stepped configuration with the at least one flat portion, wherein the at least one substrate is disposed at the at least one trench;

a first inclined portion extending from a first edge of the at least one flat portion toward the display panel;

a second inclined portion extending from a second edge of the at least one flat portion toward the display panel, the second edge of the at least one flat portion connected with the first edge of the at least one flat portion at a corner of the at least one flat portion, wherein an inclination of the second inclined portion is greater than an inclination of the first inclined portion;

a first trench of the at least one trench configured to extend in a side-to-side direction at a middle region of the frame;

a second trench of the at least one trench being adjacent to the first trench and configured to extend in the side-to-side direction, wherein the second trench is wider than the first trench; and a third trench of the at least one trench opposite the second trench with respect to the first trench and configured to extend in the side-to-side direction, wherein the third trench is wider than the first trench, wherein the at least one substrate is disposed on one of the first trench or the third trench, wherein a light assembly closest to the second inclined portion of the plurality of light assemblies is mounted on the at least one substrate, and wherein a first distance between the light assembly and the first inclined portion is greater than a second distance between the light assembly and the second inclined portion.

2. The display device of claim 1,
wherein the at least one substrate comprises:
a first substrate disposed at the first trench, wherein a first plurality of light assemblies is mounted on the first substrate; and
a second substrate disposed at the second trench, wherein a second plurality of light assemblies is mounted on the second substrate.

3. The display device of claim 2, wherein the frame further comprises:
a first plurality of projections disposed at the first trench and arranged along a longitudinal direction of the first trench;
a second plurality of projections disposed at the second trench and arranged along a longitudinal direction of the second trench; and
a third plurality of projections disposed at the second trench and arranged along the longitudinal direction of the second trench spaced apart from the second plurality of projections.

4. The display device of claim 3, wherein a height of each of the projections of the first, second, and third plurality of projections is substantially the same as a depth of the first and second trenches with respect to the flat portion.

5. The display device of claim 3, wherein each projection of the first plurality of projections is configured to engage with a corresponding groove of the first substrate to secure the first substrate to the frame.

6. The display device of claim 2, wherein the frame further comprises a plurality of projections disposed at the first trench and each projection of the plurality of projections is configured to engage with a corresponding groove of the first substrate to secure the first substrate to the frame.

7. The display device of claim 1, wherein the at least one substrate comprises:
a first substrate disposed at the first trench, wherein a first plurality of light assemblies is mounted on the first substrate;
a second substrate disposed at the second trench and positioned toward a side of the second trench distal from the first trench, wherein a second plurality of light assemblies is mounted on the second substrate; and
a third substrate disposed at the third trench and positioned toward a side of the third trench distal from the first trench, wherein a third plurality of light assemblies is mounted on the third substrate.

8. The display device of claim 1, wherein the at least one substrate comprises:
a first substrate disposed at the second trench and positioned toward a side of the second trench proximal to the first trench, wherein a first plurality of light assemblies is mounted on the first substrate; and
a second substrate disposed at the third trench and positioned toward a side of the third trench proximal to the first trench, wherein a second plurality of light assemblies is mounted on the second substrate.

9. The display device of claim 1, wherein the at least one substrate comprises:
a first substrate disposed at the second trench and positioned toward a side of the second trench proximal to the first trench, wherein a first plurality of light assemblies is mounted on the first substrate; and
a second substrate disposed at the third trench and positioned toward a side of the third trench proximal to the first trench, wherein a second plurality of light assemblies is mounted on the second substrate,
wherein a particular light assembly of the plurality of light assemblies is positioned adjacent to the first inclined portion and the second inclined portion and is configured to have an elongated shape extending toward one of the first inclined portion or the second inclined portion.

10. The display device of claim 9, wherein the particular light assembly is configured to have the elongated shape extending toward the first inclined portion.

* * * * *